US012609848B2

(12) United States Patent
Shin et al.

(10) Patent No.: US 12,609,848 B2
(45) Date of Patent: Apr. 21, 2026

(54) ELECTRONIC APPARATUS AND CONTROLLING METHOD THEREOF FOR CONTROLLING A PLURALITY OF NODE DEVICES CONNECTED IN SERIES

(71) Applicant: SAMSUNG ELECTRONICS CO., LTD., Suwon-si (KR)

(72) Inventors: Kiock Shin, Suwon-si (KR); Changhun Kim, Suwon-si (KR); Sarfaraz Ahmed, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 724 days.

(21) Appl. No.: 17/970,186

(22) Filed: Oct. 20, 2022

(65) Prior Publication Data

US 2023/0208673 A1 Jun. 29, 2023

Related U.S. Application Data

(63) Continuation of application No. PCT/KR2022/013896, filed on Sep. 16, 2022.

(30) Foreign Application Priority Data

Dec. 24, 2021 (KR) ........................ 10-2021-0187482

(51) Int. Cl.
*H04L 12/40* (2006.01)
*H04L 69/324* (2022.01)

(52) U.S. Cl.
CPC ............ *H04L 12/40* (2013.01); *H04L 69/324* (2013.01)

(58) Field of Classification Search
CPC ......... H04L 1/00; H04L 12/40; H04L 12/407; H04L 69/324; H04L 1/0081; H04L 1/0083; H04L 12/40071
See application file for complete search history.

(56) References Cited

U.S. PATENT DOCUMENTS

| | | | |
|---|---|---|---|
| 6,111,876 A | 8/2000 | Frantz et al. | |
| 6,389,030 B1 * | 5/2002 | Coden ................... H04L 49/102 | |
| | | | 709/251 |
| 7,433,353 B2 | 10/2008 | Lim et al. | |
| 9,294,590 B2 | 3/2016 | Hwang et al. | |
| 10,826,876 B1 | 11/2020 | Sinn et al. | |
| 10,949,157 B2 | 3/2021 | Rycyna et al. | |
| 2005/0220096 A1 | 10/2005 | Friskney et al. | |

(Continued)

FOREIGN PATENT DOCUMENTS

| | | |
|---|---|---|
| EP | 2 930 896 B1 | 11/2016 |
| EP | 3 116 166 B1 | 9/2018 |

(Continued)

OTHER PUBLICATIONS

Search Report (PCT/ISA/210), dated Dec. 13, 2022, issued by the International Searching Authority, Application No. PCT/KR2022/013896.

(Continued)

*Primary Examiner* — Ayman A Abaza
*Assistant Examiner* — Hooman Houshmand
(74) *Attorney, Agent, or Firm* — Sughrue Mion, PLLC

(57) ABSTRACT

There is provided an electronic apparatus including one or more processor that obtains at least one target node device corresponding to a user command, among the plurality of node devices, and a control command corresponding to the user command, generates an Ethernet frame based on the content and the control command, the Ethernet frame including a data field, and transmits the Ethernet frame to any one of the one or more node devices through the communication interface. The data field includes a content area configured to store information on the content and a plurality of node areas each corresponding to the plurality of node devices, and the control command is stored in a node area corresponding to the at least one target node device among the plurality of node areas.

21 Claims, 25 Drawing Sheets

(56) References Cited

U.S. PATENT DOCUMENTS

| | | | |
|---|---|---|---|
| 2005/0265332 A1 | 12/2005 | Lim et al. | |
| 2007/0255855 A1* | 11/2007 | Knapp | H04J 3/0647 |
| | | | 709/248 |
| 2010/0103939 A1 | 4/2010 | Carlson et al. | |
| 2010/0211711 A1* | 8/2010 | Kuschke | H04L 12/4625 |
| | | | 710/110 |
| 2014/0126584 A1 | 5/2014 | Hwang et al. | |
| 2017/0099158 A1* | 4/2017 | Mizutani | H04L 12/403 |
| 2019/0187909 A1* | 6/2019 | Pinto | G06F 3/0683 |
| 2020/0374151 A1 | 11/2020 | Meier | |
| 2021/0392011 A1 | 12/2021 | Mutter | |

FOREIGN PATENT DOCUMENTS

| | | | |
|---|---|---|---|
| EP | 3 818 683 A1 | 5/2020 | |
| EP | 4 391 487 A1 | 6/2024 | |
| JP | 4793138 B2 | 10/2011 | |
| JP | 5102784 B2 | 12/2012 | |
| KR | 10-2005-0108932 A | 11/2005 | |
| KR | 10-2014-0058214 A | 5/2014 | |
| KR | 10-1503629 B2 | 3/2015 | |
| KR | 10-2020-0049444 A | 5/2020 | |
| KR | 10-2021-0121214 A | 10/2021 | |
| WO | 2021008687 A1 | 1/2021 | |

OTHER PUBLICATIONS

Written Opinion (PCT/ISA/237), dated Dec. 13, 2022, issued by the International Searching Authority, Application No. PCT/KR2022/013896.

Communication dated Dec. 16, 2024, issued by the European Patent Office in European Application No. 22911515.9.

* cited by examiner

FIG. 3
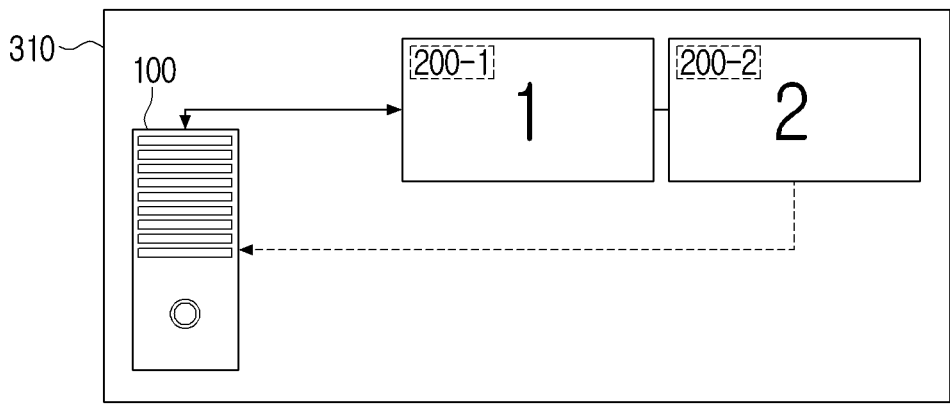
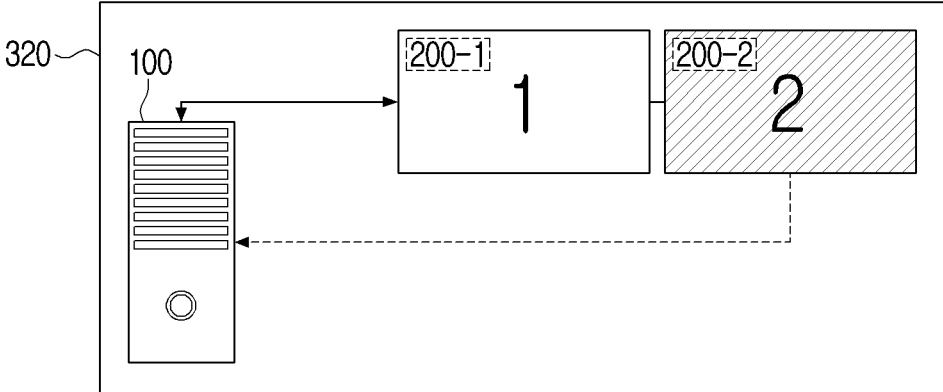
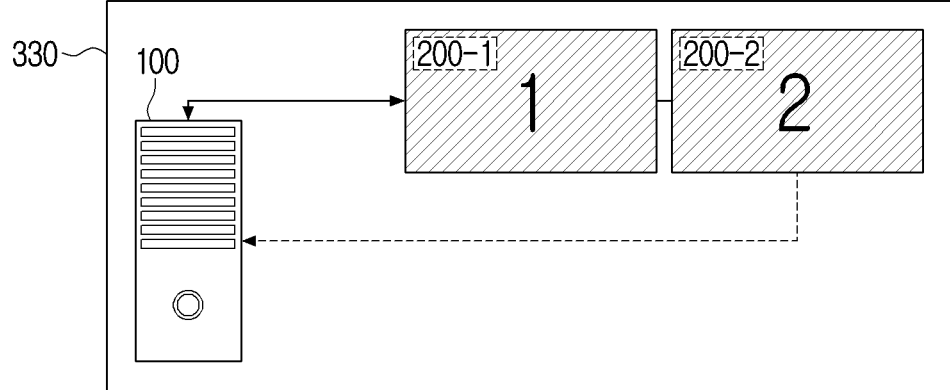

| CTRL_CMD | description |
|----------|-------------|
| 0000_0000 | IDLE |
| 0000_0001 | ONE Node WR |
| 0000_0010 | ONE Node RD |
| 0000_0011 | ONE Node Burst WR |
| 0000_0100 | ONE Node Burst RD |
| 1000_0001 | Multi-node WR |
| 1000_0010 | Multi-node RD |

FIG. 14

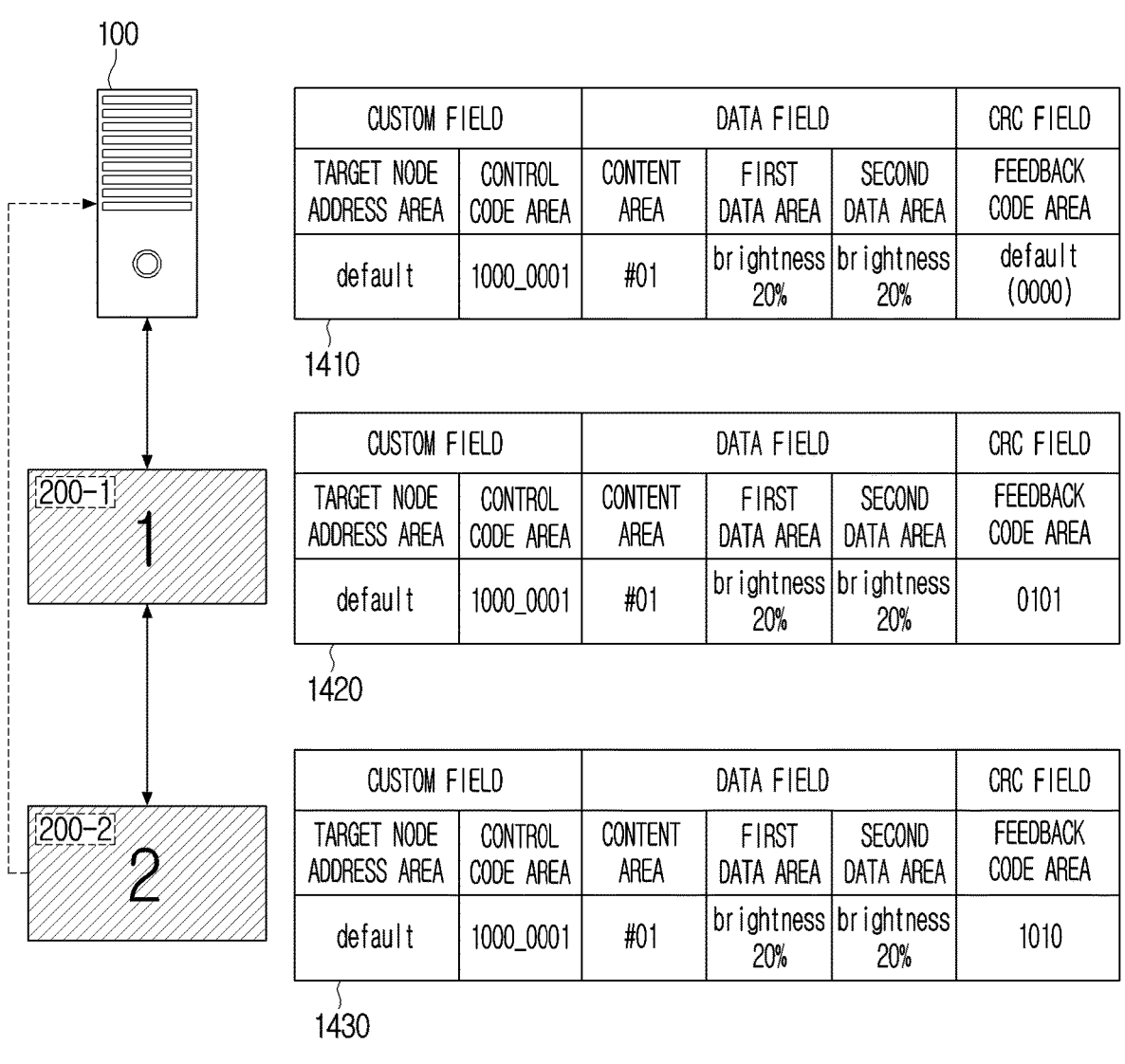

| | CUSTOM FIELD | | DATA FIELD | | | CRC FIELD |
|---|---|---|---|---|---|---|
| | TARGET NODE ADDRESS AREA | CONTROL CODE AREA | CONTENT AREA | FIRST DATA AREA | SECOND DATA AREA | FEEDBACK CODE AREA |
| | default | 1000_0001 | #01 | brightness 20% | brightness 20% | default (0000) |

1410

| | CUSTOM FIELD | | DATA FIELD | | | CRC FIELD |
|---|---|---|---|---|---|---|
| | TARGET NODE ADDRESS AREA | CONTROL CODE AREA | CONTENT AREA | FIRST DATA AREA | SECOND DATA AREA | FEEDBACK CODE AREA |
| | default | 1000_0001 | #01 | brightness 20% | brightness 20% | 0101 |

1420

| | CUSTOM FIELD | | DATA FIELD | | | CRC FIELD |
|---|---|---|---|---|---|---|
| | TARGET NODE ADDRESS AREA | CONTROL CODE AREA | CONTENT AREA | FIRST DATA AREA | SECOND DATA AREA | FEEDBACK CODE AREA |
| | default | 1000_0001 | #01 | brightness 20% | brightness 20% | 1010 |

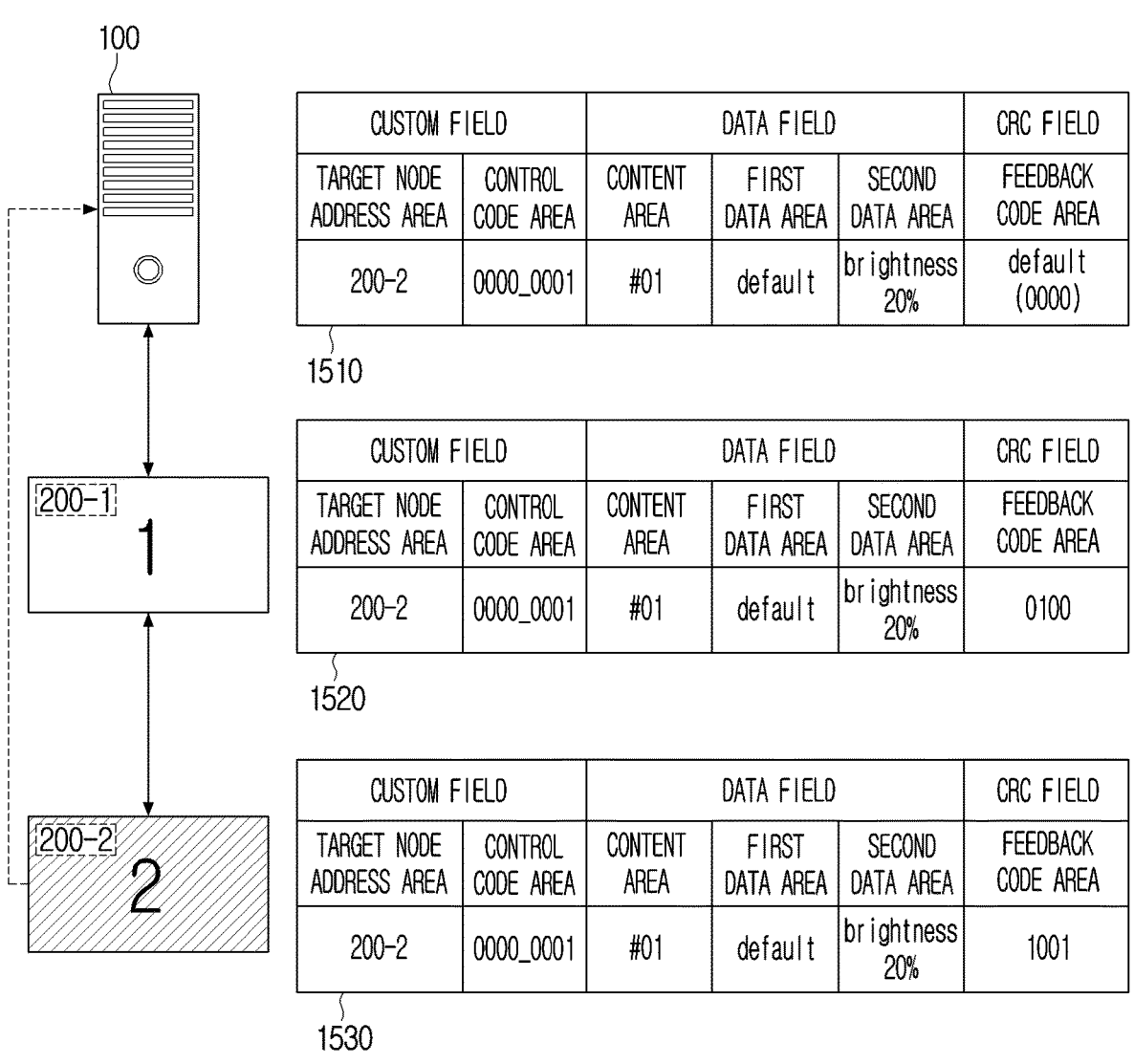

| CUSTOM FIELD | | DATA FIELD | | | CRC FIELD |
|---|---|---|---|---|---|
| TARGET NODE ADDRESS AREA | CONTROL CODE AREA | CONTENT AREA | FIRST DATA AREA | SECOND DATA AREA | FEEDBACK CODE AREA |
| 200-2 | 0000_0001 | #01 | default | brightness 20% | default (0000) |

1510

| CUSTOM FIELD | | DATA FIELD | | | CRC FIELD |
|---|---|---|---|---|---|
| TARGET NODE ADDRESS AREA | CONTROL CODE AREA | CONTENT AREA | FIRST DATA AREA | SECOND DATA AREA | FEEDBACK CODE AREA |
| 200-2 | 0000_0001 | #01 | default | brightness 20% | 0100 |

1520

| CUSTOM FIELD | | DATA FIELD | | | CRC FIELD |
|---|---|---|---|---|---|
| TARGET NODE ADDRESS AREA | CONTROL CODE AREA | CONTENT AREA | FIRST DATA AREA | SECOND DATA AREA | FEEDBACK CODE AREA |
| 200-2 | 0000_0001 | #01 | default | brightness 20% | 1001 |

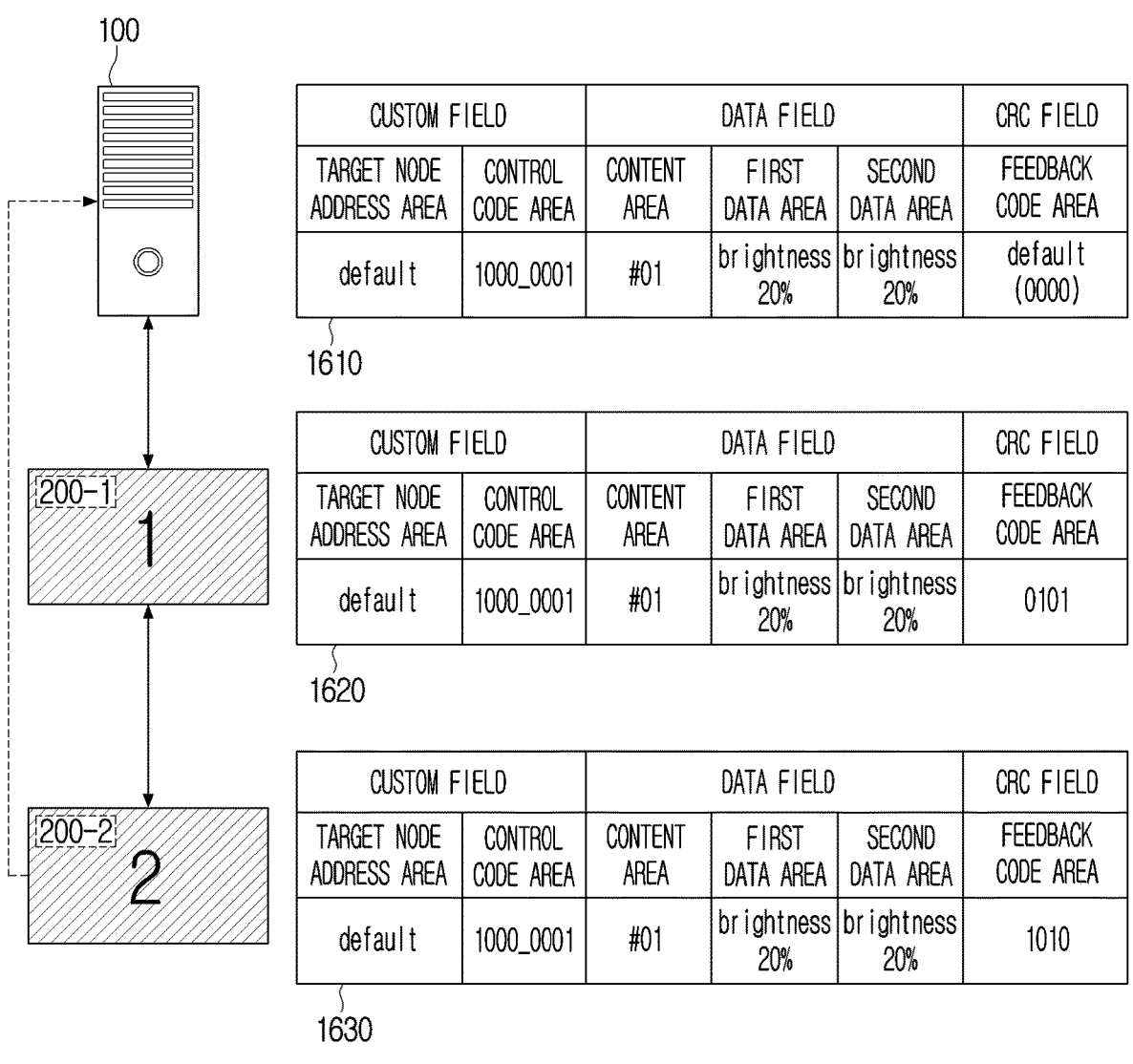

| CUSTOM FIELD | | DATA FIELD | | | CRC FIELD |
|---|---|---|---|---|---|
| TARGET NODE ADDRESS AREA | CONTROL CODE AREA | CONTENT AREA | FIRST DATA AREA | SECOND DATA AREA | FEEDBACK CODE AREA |
| default | 1000_0001 | #01 | brightness 20% | brightness 20% | default (0000) |

1610

| CUSTOM FIELD | | DATA FIELD | | | CRC FIELD |
|---|---|---|---|---|---|
| TARGET NODE ADDRESS AREA | CONTROL CODE AREA | CONTENT AREA | FIRST DATA AREA | SECOND DATA AREA | FEEDBACK CODE AREA |
| default | 1000_0001 | #01 | brightness 20% | brightness 20% | 0101 |

1620

| CUSTOM FIELD | | DATA FIELD | | | CRC FIELD |
|---|---|---|---|---|---|
| TARGET NODE ADDRESS AREA | CONTROL CODE AREA | CONTENT AREA | FIRST DATA AREA | SECOND DATA AREA | FEEDBACK CODE AREA |
| default | 1000_0001 | #01 | brightness 20% | brightness 20% | 1010 |

1630

ELECTRONIC APPARATUS AND CONTROLLING METHOD THEREOF FOR CONTROLLING A PLURALITY OF NODE DEVICES CONNECTED IN SERIES

CROSS-REFERENCE TO RELATED APPLICATION

This application is a bypass continuation of International Application No. PCT/KR2022/013896, filed on Sep. 16, 2022, which is based on and claims priority to Korean Patent Application No. 10-2021-0187482, filed on Dec. 24, 2021, in the Korean Intellectual Property Office, the disclosures of which are incorporated by reference herein in their entireties.

BACKGROUND

1. Field

The disclosure relates to an electronic apparatus and a controlling method thereof, and more particularly, to an electronic apparatus for controlling a plurality of node devices connected to each other by serial communication, and a controlling method thereof.

2. Description of Related Art

In computer network technology, Ethernet may be used as an interface for data communication. A communication system using the Ethernet may include a primary device and a plurality of secondary devices (e.g., node devices). The Ethernet is a bus-structured local area network and computer network technology for transmitting data to the plurality of node devices.

In case that the primary device performs one-to-one communication with each node device to communicate with the plurality of node devices, the number of communication may be increased based on the number of node devices. For example, it may take "n" communication times for the primary device to communicate with "n" node devices. In case that the "n" communications are performed, data transmission may take a long time.

In addition, in case that there are a plurality of target node devices that a user wants to control, a process of transmitting a control command to the plurality of target node devices in an Ethernet frame may be complicated and take a long time.

SUMMARY

The disclosure provides an electronic apparatus providing an Ethernet frame based on a data field including a plurality of node areas each corresponding to a plurality of node devices, and a controlling method thereof.

According to an aspect of the disclosure, there is provided an electronic apparatus including: a memory configured to store content, a communication interface configured to communicate with one or more node devices, among a plurality of node devices connected in a serial communication, and one or more processor configured to: obtain at least one target node device corresponding to a user command, among the plurality of node devices, and a control command corresponding to the user command, generate (or provide) an Ethernet frame based on the content and the control command, the Ethernet frame including a data field, and transmit the Ethernet frame to any one of the one or more node devices through the communication interface, wherein the data field includes a content area configured to store information on the content and a plurality of node areas each corresponding to the plurality of node devices, and wherein the control command is stored in a node area corresponding to the at least one target node device among the plurality of node areas.

The Ethernet frame may further include a custom field, and the one or more processor may be further configured to: obtain control code information on at least one of the number or transmission method of the at least one target node device based on the user command, and generate the Ethernet frame by including the obtained control code information in the custom field.

The at least one node device may include a first node device and a second node device, and wherein the one or more processor may be further configured to: transmit the Ethernet frame including the control command to the first node device through the communication interface, and identify integrity of an execution result of the control command made by the at least one target node device based on a feedback frame based on the feedback frame being received from the second node device.

The feedback frame may be a second feedback frame, and the second feedback frame is provided by the second node device based on a first feedback frame provided by the first node device, and wherein the first feedback frame may be a feedback frame for an operation performed by the first node device based on the Ethernet frame, and the second feedback frame may be a feedback frame for an operation performed by the second node device that receives the first feedback frame from the first node device.

The one or more processor may be further configured to: obtain reference code information corresponding to the control command, obtain feedback code information included in the feedback frame based on the feedback frame being received through the communication interface, and identify the integrity of the execution result of the control command based on the obtained feedback code information and reference code information.

The one or more processor may be further configured to retransmit the Ethernet frame to the first node device through the communication interface based on a mismatch between the obtained feedback code information and reference code information.

The feedback code information may be code information provided by each of the plurality of node devices by updating the feedback code information received from an adjacent node device through the serial communication.

The one or more processor may be configured to provide the Ethernet frame including the content and the control command corresponding to a predetermined command based on the user command including the predetermined command, and generate the Ethernet frame including the content based on the user command not including the predetermined command.

In case that the user command is a command to control each of a first target node device and a second target node device, the one or more processor may be configured to store a first control command to control the first target node device in a first node area corresponding to the first target node device among the plurality of areas included in the data field and a second control command to control the second target node device in a second node area corresponding to the second target node device among the plurality of areas included in the data field, and provide the Ethernet frame based on the data field including the first control command and the second control command.

The Ethernet frame may further include a custom field, and in case that the user command is a command to control one target node device among the plurality of node devices, and the one or more processor may be further configured to: store node address information corresponding to the target node device in the custom field, store the control command to control the target node device in any area of the data field, and generate the Ethernet frame based on the custom field including the node address information and the data field including the control command.

According to another aspect of the disclosure, there is provided a controlling method of an electronic apparatus storing content and communicating with one or more node devices, among a plurality of node devices connected by serial communication, the controlling method including: obtaining at least one target node device corresponding to a user command among the plurality of node devices, and a control command corresponding to the user command; generating an Ethernet frame based on the content and the control command, the Ethernet frame including a data field; and transmitting the Ethernet frame to any one of the one or more node devices, wherein the data field includes a content area configured to store information on the content and a plurality of node areas each corresponding to the plurality of node devices, and wherein the control command is stored in a node area corresponding to the at least one target node device among the plurality of node areas.

The Ethernet frame may further include a custom field, and wherein the controlling method may further include obtaining control code information on at least one of the number or transmission method of the at least one target node device based on the user command; and generating the Ethernet frame by including the obtained control code information in the custom field.

The at least one node device may include a first node device and a second node device, wherein, in the transmitting, the Ethernet frame including the control command is transmitted to the first node device, and wherein the controlling method may further include identifying integrity of an execution result of the control command made by the at least one target node device based on a feedback frame in case that the feedback frame is received from the second node device.

The feedback frame is a second feedback frame, and the second feedback frame is provided by the second node device based on a first feedback frame provided by the first node device, and wherein the first feedback frame being a feedback frame for an operation performed by the first node device based on the Ethernet frame, and the second feedback frame being a feedback frame for an operation performed by the second node device that receives the first feedback frame from the first node device.

The identifying of the integrity may include obtaining reference code information corresponding to the control command, obtaining feedback code information included in the feedback frame based on the feedback frame being received, and identifying the integrity of the execution result of the control command based on the obtained feedback code information and reference code information.

According to another aspect of the disclosure, there is provided an electronic apparatus including: a memory configured to store one or more instructions; and one or more processor configured execute the one or more instructions to: obtain a first node device in a node device network based on an input command, the node device network including a plurality of node devices connected in series; obtain a control command corresponding to the first node device based on the input command; generate an Ethernet frame by including the control command in a first area, among a plurality of areas, each of the plurality of areas respectively associated with one of the plurality of node devices connected in series; and transmit the Ethernet frame to the node device network.

The input command may be a user input.

The plurality of node devices may be configured to communicate within the series in a bi-directional manner.

The first node device may be located at a start of the series connection.

The first node device may be at a location other than a start of the series connection.

BRIEF DESCRIPTION OF THE DRAWINGS

FIG. 3 is a view for explaining a method of controlling the plurality of node devices according to an example embodiment of the disclosure;

FIG. 8 is a table for explaining control code information;

FIG. 14 is a view for explaining an operation of updating the Ethernet frame based on the operation of controlling the plurality of target node devices through the single-node Ethernet frame structure according to an example embodiment of the disclosure;

FIG. 15 is a view for explaining an operation of updating the Ethernet frame based on the operation of controlling one target node device through the multi-node Ethernet frame structure according to an example embodiment of the disclosure;

FIG. 16 is a view for explaining an operation of updating the Ethernet frame based on the operation of controlling the plurality of target node devices through the multi-node Ethernet frame structure according to an example embodiment of the disclosure;

DETAILED DESCRIPTION

Hereinafter, the disclosure will be described in detail with reference to the accompanying drawings.

Terms used in embodiments of the disclosure are selected as general terms currently and widely used as possible while considering their functions in the disclosure, and these terms may depend on intentions of those skilled in the art, precedents, emergence of new technology, etc. In addition, in a specific case, there is a term arbitrarily selected by the applicant, and in this case, the meaning will be described in detail in the corresponding description of the disclosure. Therefore, the term used in the disclosure should be defined based on the meaning of the term and an overall content of the disclosure, not just the name of the term.

In this specification, an expression such as "have," "may have," "include" or "may include" refer to the presence of the corresponding feature (e.g., component such as number, function, operation, part or the like) and does not exclude the presence of an additional feature.

An expression "at least one of A and/or B" is to be understood as indicating any one of "A," "B" or "A and B."

Expressions such as "first" and "second," used in this specification may modify various components in any sequence and/or importance, and are used only to distinguish one component from another component, and do not limit the components.

It is to be understood that in case that one component (e.g., first component) is referred to as being "(operatively or communicatively) coupled with/to" or "connected to" another component (e.g., second component), the one component may be directly coupled to another component, or may be coupled to another component through yet another component (e.g., third component).

A term in a singular form may include its plural form unless the context clearly dictates otherwise. It is to be understood that terms such as "comprise," "include" and the like, used in this specification specify the presence of features, numerals, steps, operations, components, parts mentioned in the specification, or combinations thereof, and do not preclude the presence or addition of one or more other features, numerals, steps, operations, components, parts or combinations thereof.

In the disclosure, a "module" or "unit" performs at least one function or operation, and may be implemented as hardware or software, or a combination of hardware and software. In addition, a plurality of "modules" or a plurality of "units" may be integrated into at least one module and implemented by at least one processor (not shown), except for a "module" or "unit" that needs to be implemented into specific hardware.

In this specification, a term "user" may refer to a person using an electronic apparatus or a device using the electronic apparatus (e.g., artificial-intelligence electronic apparatus).

Hereinafter, example embodiments of the disclosure will be described in more detail with reference to the accompanying drawings.

Figure 1:
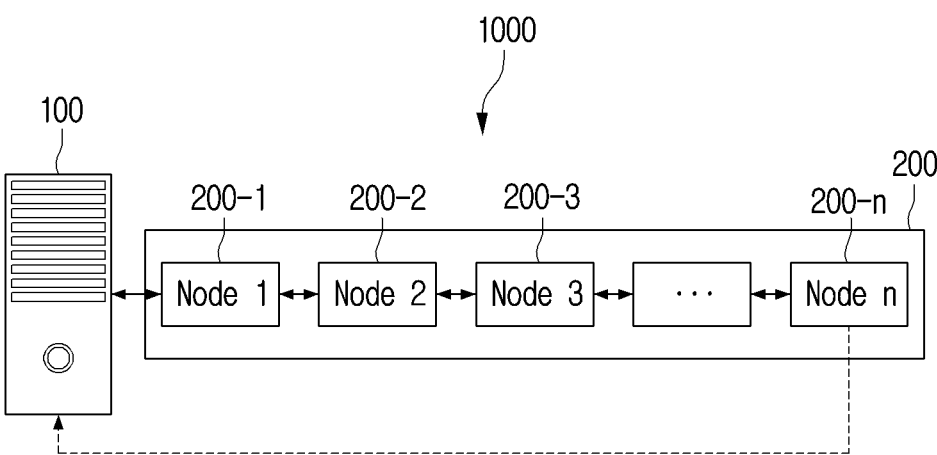
FIG. 1 is a view for explaining a system including an electronic apparatus and a plurality of node devices.

FIG. 1 is a view for explaining a system 1000 including an electronic apparatus 100 and a node network 200.

Referring to FIG. 1, the system 1000 may include the electronic apparatus 100 and the node network 200. Here, the system 1000 may be system implemented by serial communication or serial transmission. In detail, the electronic apparatus 100 and the node network 200 may perform communication in a serial communication method or in a serial transmission method. Here, the serial communication or the serial transmission may refer to a method in which a plurality of devices are all connected to each other in series through a main communication line.

Here, the electronic apparatus 100 may refer to a management device controlling the node network 200. Here, the electronic apparatus 100 may be a primary device or a host device.

Here, the node network 200 may refer to a network including a plurality of node devices 200-1 to 200-n controlled by the electronic apparatus 100. Here, each of the plurality of node devices 200-1 to 200-n may be a client device or a sub-device. For example, one or more of the plurality of node devices 200-1 to 200-n may be a client device of the electronic apparatus or a secondary device associated with the electronic apparatus 100. Here, the plurality of node devices 200-1 to 200-n may be one or more node devices. For example, the node network 200 may include the first node device 200-1, a second node device 200-2, a third node device 200-3, . . . , and the n-th node device 200-n.

For example, the electronic apparatus 100 may transmit data to the first node device 200-1 of the node network 200, and the first node device 200-1 may transmit the data received from the electronic apparatus 100 to the second node device 200-2. The second node device 200-2 may then transmit the data received from the first node device 200-1 to the third node device 200-3. Meanwhile, the n-th node device 200-n may transmit the data received from a previous node device back to the electronic apparatus 100.

The n-th node device 200-n may retransmit the data in a reverse direction (or reverse path) of a path through which the received data is transmitted. The n-th node device 200-n may resultantly transmit the received data to the electronic apparatus 100 through the reverse path. For example, the electronic apparatus 100 may transmit data to the n-th node device 200-n of the node network 200, and the n-th node device 200-n may transmit the data received from the electronic apparatus 100 to the third node device 200-3. The third node device 200-3 may then transmit the data received from the n-th node device 200-n to the second node device 200-2. The second node device 200-2 may then transmit the data received from the third node device 200-3 to the first node device 200-1, and the first node device 200-1 may transmit the data received from second node device 200-2 back to the electronic apparatus 100.

Figure 2:
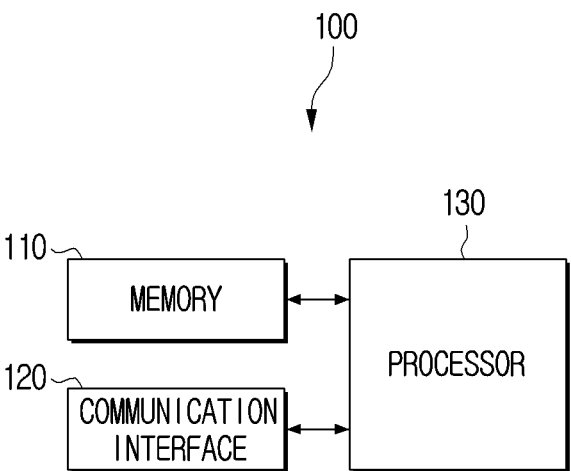
FIG. 2 is a block diagram showing the electronic apparatus according to an example embodiment of the disclosure.

FIG. 2 is a block diagram showing the electronic apparatus 100 according to an example embodiment of the disclosure.

Referring to FIG. 2, the electronic apparatus 100 may include a memory 110, a communication interface 120 and a processor 130.

The electronic apparatus 100 according to various examples of an example embodiment in this specification may include, for example, at least one of a smartphone, a tablet personal computer (PC), a mobile phone, a desktop PC, a laptop PC, a personal digital assistant (PDA) or a portable multimedia player (PMP). In some examples, the electronic apparatus 100 may include, for example, at least one of a television, a digital video disk (DVD) player or a media box (e.g., Samsung HomeSync™, Apple TV™ or Google TV™).

The memory 110 may be implemented as an internal memory such as a read-only memory (ROM) (e.g., electrically erasable programmable read-only memory (EEPROM)), a random access memory (RAM) or the like, included in the processor 130, or may be implemented as a memory separate from the processor 130. In this case, the memory 110 may be implemented in the form of a memory embedded in the electronic apparatus 100 or in the form of a memory detachable from the electronic apparatus 100 based on a purpose of storing data. For example, data for driving the electronic apparatus 100 may be stored in the memory embedded in the electronic apparatus 100, and data for an extended function of the electronic apparatus 100 may be stored in the memory detachable from the electronic apparatus 100.

Meanwhile, the memory embedded in the electronic apparatus 100 may be implemented as at least one of a volatile memory (e.g., dynamic RAM (DRAM), static RAM (SRAM) or synchronous dynamic RAM (SDRAM)), a non-volatile memory (e.g., one time programmable ROM (OT-PROM), programmable ROM (PROM), erasable and programmable ROM (EPROM), electrically erasable and programmable ROM (EEPROM), mask ROM, flash ROM or flash memory (e.g., NAND flash or NOR flash)), a hard drive or a solid state drive (SSD), and the memory detachable from the electronic apparatus 100 may be implemented as a memory card (e.g., compact flash (CF), secure digital (SD)), micro secure digital (Micro-SD), mini secure digital (Mini-SD), extreme digital (xD) or multi-media card (MMC)) or an external memory which may be connected to a universal serial bus (USB) port (e.g., USB memory), etc.

The communication interface 120 may be a component communicating with various types of external devices by using various types of communication methods. The communication interface 120 may include a wireless communication module or a wired communication module. Here, each communication module may be implemented in the form of at least one hardware chip.

Here, the wireless communication module may be a module that wirelessly communicates with the external device. For example, the wireless communication module may include at least one of a wireless-fidelity (Wi-Fi) module, a Bluetooth module, an infrared communication module or another communication module.

Here, the wired communication module may be a module that communicates with the external device by wire. For example, the wired communication module may include at least one of a local area network (LAN) module, an Ethernet module, a pair cable, a coaxial cable, a fiber optic cable or an ultra wide-band (UWB) module.

Meanwhile, the description below describes an example in which the communication interface 120 uses the Ethernet module to communicate with the node network 200.

The processor 130 may perform an overall control operation of the electronic apparatus 100. In detail, the processor 130 may function to control an overall operation of the electronic apparatus 100.

The processor 130 may be implemented as a digital signal processor (DSP), a microprocessor and a time controller (TCON) for processing a digital signal. However, the processor 130 is not limited thereto. The processor 130 may include one or more of a central processing unit (CPU), a micro controller unit (MCU), a micro processing unit (MPU), a controller, an application processor (AP), a graphics-processing unit (GPU), a communication processor (CP) or an ARM processor, or may be defined by these terms. In addition, the processor 130 may be implemented as a system on chip (SoC) or large scale integration (LSI) including a built-in processing algorithm, or implemented in the form of a field programmable gate array (FPGA). In addition, the processor 130 may perform various functions by executing computer executable instructions stored in the memory 110.

The electronic apparatus 100 may include the memory 110 storing content and the communication interface 120 communicating with at least one node device among the plurality of node devices 200-1 to 200-n connected by the serial communication.

The electronic apparatus 100 may perform the serial communication with the node network 200. Here, the node network 200 may include the plurality of node devices 200-1 to 200-n. Here, the plurality of node devices 200-1 to 200-n may perform the serial communication with each other. Descriptions using the serial communication are described with reference to FIGS. 3 to 6.

The processor 130 may obtain at least one target node device corresponding to a user command among the plurality of node devices 200-1 to 200-n, provide an Ethernet frame including a data field based on the content and the control command, and transmit the provided Ethernet frame to any one of at least one node device through the communication interface 120.

Here, the data field included in the Ethernet frame may include a content area where information on the content is stored and a plurality of node areas each corresponding to the plurality of node devices 200-1 to 200-n, and the control command may be stored in an node area corresponding to at least one target node device among the plurality of node areas.

Here, the processor 130 may obtain the user command. Here, the user command may refer to a command for a user to control at least one node device among the plurality of node devices 200-1 to 200-n included in node network 200.

The user command may refer to a command other than a default command transmitted to the node network 200. Here, the default command may refer to a command that the electronic apparatus 100 transmits to the node network 200 even in case that the user command is not received. Here, the default command may refer to a command that the electronic apparatus 100 transmits to the node network 200 all the time. Here, the user command may refer to a command to control at least one node device. For example, the default command may be a command to provide the content to all the node devices 200-1 to 200-n. In addition, the user command may be a command to set brightness of a display of a certain node device to 20% among the plurality of node devices 200-1 to 200-n.

In another example, the user commands may include all commands transmitted to the node network 200. Here, the user commands may refer to all the control commands transmitted to the node network 200. For example, the user commands may include at least one of the command to provide the content to all the plurality of node devices 200-1 to 200-n or the command to set the brightness of the display of some node devices to 20% among the plurality of node devices 200-1 to 200-n.

The description below describes that the user command refers to a command other than the default command for convenience.

Here, the processor 130 may identify at least one target node device that the user wants to control based on the user command. In addition, the processor 130 may identify the control command related to an operation to be performed at the at least one target node device by the user based on the user command. Here, the operation may be a control operation. As a result, the processor 130 may identify at least one target node device and the control command based on the user command. In addition, the processor 130 may transmit the Ethernet frame to the target node device for at least one target node device to execute the control command. In detail, the Ethernet frame may include control information for controlling at least one target node device. Here, the control information may include the control command.

Here, the processor 130 may transmit the Ethernet frame to the node network 200. The processor 130 may provide the Ethernet frame to be transmitted to the node network 200. Here, the processor 130 may generate the Ethernet frame to be transmitted to the node network 200. In detail, the Ethernet frame may include the data field. Here, the processor 130 may store the content and the control commands in the data field.

Here, the data field may include the content area for storing the content and a control area for storing the control command. Here, the control area may be a concept encompassing a data area (or burst area) described in an example 701 of FIG. 7 and the node area described in an example 702 of FIG. 7.

According to an example embodiment, the control area may include the plurality of data areas divided based on a size of a storage space. For example, the control area may include a first data area, a second data area, . . . and an n-th data area. In addition, the processor 130 may store the control command to be transmitted to the target node device in any of the plurality of data areas included in the control area. The control area including the plurality of data areas may be included in the data field of a single-node Ethernet frame. The single-node Ethernet frame is described in the example 701 of FIG. 7.

As another example, the control area may include the plurality of node areas each corresponding to the plurality of node devices 200-1 to 200-n included in the node network 200. Here, the plurality of node areas may refer to areas respectively allocated for the plurality of node devices 200-1 to 200-n. In case that a separate node area is allocated to each of the plurality of node devices 200-1 to 200-n, the plurality of node devices 200-1 to 200-n may execute the control command stored in its own node area. The control area including the plurality of node areas may be included in the data field of a multi-node Ethernet frame. The multi-node Ethernet frame is described in the example 702 of FIG. 7.

In addition, the processor 130 may generate the Ethernet frame based on the data field. According to an example embodiment, the processor 130 may generate the Ethernet frame based on the data field. In addition, the processor 130 may transmit the Ethernet frame to one node device of the plurality of node devices 200-1 to 200-n included in the node network 200.

According to an example embodiment, in a case that there is one target node device, the electronic apparatus 100 may provide the single-node Ethernet frame. In addition, in a case that there are two or more target node devices, the electronic apparatus 100 may provide the multi-node Ethernet frame. A specific operation related thereto is described with reference to FIG. 20. Meanwhile, a description of the corresponding example may be implemented by combining descriptions made reference to FIGS. 9 and 12 with each other. In addition, a description of the corresponding example may be implemented by combining descriptions made reference to FIGS. 13 and 16 with each other.

As yet another example embodiment, the electronic apparatus 100 may control the target node device by using the single-node Ethernet frame, regardless of the number of target node devices. Meanwhile, a description of the corresponding example may be implemented by combining descriptions made reference to FIGS. 13 and 14 with each other.

As still another example embodiment, the electronic apparatus 100 may control the target node device by using the multi-node Ethernet frame, regardless of the number of target node devices. This example is described with reference to FIG. 21. Meanwhile, a description of the corresponding example may be implemented by combining descriptions made reference to FIGS. 11 and 12 with each other. In addition, a description of the corresponding example may be implemented by combining descriptions made reference to FIGS. 15 and 16.

Meanwhile, the Ethernet frame may further include a custom field, and the processor 130 may obtain control code information on at least one of the number or transmission method of the at least one target node device based on the user command, and generate the Ethernet frame by including the obtained control code information in the custom field.

Figure 7:
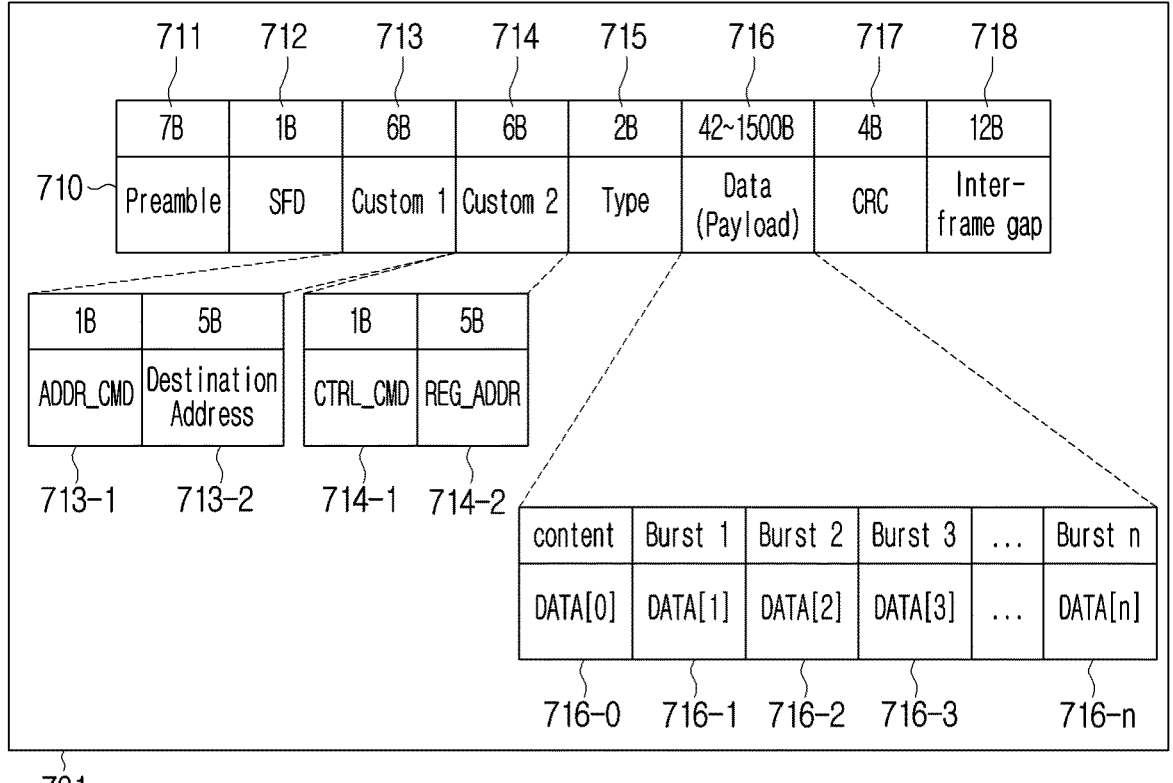
FIG. 7 is a diagram for explaining examples of an Ethernet frame.

Here, the custom field may refer to the first custom field 713 or the second custom field 714 of FIG. 7. In addition, the control code information is described in detail in table 805 of FIG. 8.

Here, the user command may be a command to control the target node device. The processor 130 may thus identify the number of target node devices by analyzing the user command.

In addition, the processor 130 may identify the transmission method by analyzing the user command. Here, the transmission method may include a normal mode and a burst mode.

Here, the normal mode may refer to any of various data transmission methods. For example, the normal mode may refer to a method of transmitting the data based on at least one of a predetermined data size, a predetermined packet unit or a predetermined time unit.

Here, the burst mode may be a method of continuously transmitting the data without interruption as long as there is no interruption. The burst mode may transmit the data faster than the normal mode. The burst mode may be used in case that the data size is small or communication time is short.

Here, the user command may include the transmission method indicating whether to transmit the data in the normal mode or in the burst mode. In addition, the processor 130 may obtain the control code information corresponding to the transmission method included in the user command. For example, the control code information may be "0000_0001" in case that a write control command is transmitted in the normal mode to one node device. In addition, the control code information may be "0000_0011" in case that the write control command is transmitted in the burst mode to one node device.

Here, the processor 130 may store the control code information in the custom field. In addition, the processor 130 may generate the Ethernet frame based on the custom field including the control code information.

Meanwhile, at least one node device may include the first node device 200-1 and the second node device 200-2, and the processor 130 may transmit the Ethernet frame including the control command to the first node device 200-1 through the communication interface 120, and identify integrity of an execution result of the control command made by the at least one target node device based on a feedback frame (e.g., second feedback frame in the description below) in case that the feedback frame (e.g., second feedback frame in the description below) is received from the second node device 200-2.

Here, the feedback frame may be the Ethernet frame. In detail, the feedback frame may be a frame updated from the received Ethernet frame. Therefore, any of the first feedback frame and the second feedback frame may be the Ethernet frame. However, the term feedback frame may be used in that the plurality of node devices 200-1 to 200-n each provide feedback codes to update the Ethernet frame.

Meanwhile, the feedback frame may be the second feedback frame, and the second feedback frame may be provided by the second node device 200-2, based on the first feedback frame provided by the first node device 200-1. Here, the first feedback frame may be a feedback frame for an operation performed by the first node device 200-1 based on the Ethernet frame, and the second feedback frame may be a feedback frame for an operation performed by the second node device 200-2 that receives the first feedback frame from the first node device 200-1.

Here, it may be assumed that the node network 200 includes the first node device 200-1 and the second node device 200-2. In addition, it may be assumed that the electronic apparatus 100, the first node device 200-1, the second node device 200-2 and again the electronic apparatus 100 may be connected to one another in series in this sequence. A detailed description related to the serial connection structure of the first node device 200-1 and the second node device 200-2 is described with reference to FIG. 3.

Here, the processor 130 may transmit the provided Ethernet frame to the first node device 200-1.

Here, the first node device 200-1 may perform the operation based on the Ethernet frame received from the electronic apparatus 100. The first node device 200-1 may then provide an updated Ethernet frame based on the execution result of its operation. The first node device 200-1 may then transmit the updated Ethernet frame to the second node device 200-2. According to an example embodiment, the updated Ethernet frame may be a first feedback frame.

Here, the second node device 200-2 may perform the operation based on the updated Ethernet frame (e.g., first feedback frame) received from the first node device 200-1. The second node device 200-2 may then provide a re-updated Ethernet frame based on the execution result of its operation. The second node device 200-2 may then transmit the re-updated Ethernet frame to the electronic apparatus 100. According to an example embodiment, the re-updated Ethernet frame may be a second feedback frame. For example, the second node device 200-2 may generate the re-updated Ethernet frame by further updating the updated Ethernet frame received from the first node device 200-1.

Here, the processor 130 may receive the Ethernet frame from the second node device 200-2. That is, the processor 130 may receive the re-updated Ethernet frame (e.g., the second feedback frame) from the second node device 200-2. In addition, the processor 130 may identify the integrity of the result of the operation performed by the node network 200 based on the second feedback frame. Here, an operation to identify the integrity may refer to an operation to check that there is no error in all operations performed by the node network 200. Here, all the operations performed by the node network 200 may refer to the control operations corresponding to the control commands executed by the target node device. In addition, all the operations performed by the node network 200 may be a content provision operation performed by the first node device 200-1 and the second node device 200-2.

The operations of receiving the feedback frames by the first node device 200-1 and the second node device 200-2 are described with reference to FIG. 18.

Meanwhile, the processor 130 may obtain reference code information corresponding to the control command, obtain feedback code information included in the feedback frame in case that the feedback frame is received through the communication interface 120, and identify the integrity of the execution result of the control command based on the obtained feedback code information and reference code information.

Here, the reference code information may be code information provided by the electronic apparatus 100. In addition, the feedback code information may be code information provided by the plurality of node devices 200-1 to 200-n. Different subjects that provide the reference code information and the feedback code information may be different from each other. However, functions that provide the reference code information and the feedback code information may be the same as each other. For example, the provided function may be a predefined function, and the predefined function may refer to a function whose code is changed based on the result of the operation. For example, a code value may be increased by a first value in case that a first operation is performed, and the code value may be increased by a second value in case that a second operation is performed. The processor 130 may determine whether the first operation is performed or the second operation is performed by identifying an amount of change in the code value.

Here, the processor 130 may need to determine whether at least one operation performed by the node network 200 is normally performed or whether an error occurred. The processor 130 may identify whether the operation is normally performed or whether error occurred based on the feedback frame transmitted from the node network 200.

The electronic apparatus 100 may store a code value change function in the memory 110. Here, the code value change function may be a predefined function. In addition, the processor 130 may provide the reference code information corresponding to the control command, based on the predefined function stored in the memory 110.

Here, the processor 130 may calculate the reference code information by predicting the operation to be performed by the node network 200. The operation performed by node network 200 may include at least one of the content provision operation corresponding to the default command or the control operation corresponding to the control command. Accordingly, the processor 130 may identify the operations to be performed by the node network 200 and obtain the code value calculated in case that each operation is normally performed as the reference code information. In addition, the processor 130 may store the obtained reference code information in the memory 110.

In addition, the processor 130 may identify the integrity of the result of the operation performed by the node network 200 based on the received feedback frame. The plurality of node devices 200-1 to 200-$n$ included in the node network 200 may each update the feedback code information based on the result of the operations performed by the node devices. In addition, the processor 130 may receive a feedback frame that includes finally-updated feedback code information from the node network 200 through the communication interface 120.

Here, the processor 130 may compare the reference code information stored in the memory 110 and the feedback code information received from the node network 200. The processor 130 may then identify the integrity of the execution result of the operation performed by the node network 200 based on a comparison result.

The processor 130 may determine that the operations are normally performed by the node network 200 in case that the reference code information and the feedback code information match each other.

The processor 130 may determine that the operations are abnormally performed by the node network 200 in case that the reference code information and the feedback code information do not match each other. In detail, the processor 130 may analyze the feedback code information to identify that in which node device among the plurality of node devices 200-1 to 200-$n$ the error occurs and in which operation the error occurs.

The processor 130 may perform a predetermined operation in case that the reference code information and the feedback code information do not match each other.

According to an example embodiment, the predetermined operation may be an operation of providing the user with information indicating that the error occurs. The processor 130 may provide the user with error information that includes at least one of the node device in which the error occurs or a reason for the error in case that the reference code information and the feedback code information do not match each other. Here, the operation provided to the user may be to output the error information.

According to another example embodiment, the predetermined operation may be an operation of retransmitting the control command. The processor 130 may retransmit the control command in which the error occurs to the node network 200.

According to an example embodiment, the processor 130 may retransmit the Ethernet frame to the first node device 200-1 through the communication interface 120 in case that the obtained feedback code information and reference code information do not match each other. A specific operation related thereto is described with reference to FIGS. 22 and 23.

According to an example embodiment, the feedback code information may be the code information provided by each of the plurality of node devices 200-1 to 200-$n$ by updating the feedback code information received from the adjacent node device through the serial communication.

Various examples of an operation of updating (or changing) the feedback code are described with reference to FIGS. 13 to 16.

According to an example embodiment, the processor 130 may generate the Ethernet frame including the content and the control command corresponding to a predetermined command in case that the user command includes the predetermined command, and generate the Ethernet frame including the content in case that the user command does not include the predetermined command.

Here, the predetermined command may refer to a command to control the plurality of node devices 200-1 to 200-$n$ in addition to the default command. The predetermined command may refer to a control included in the user command in addition to the default command provided repeatedly. Here, the default command may be a command that is repeatedly transmitted to the plurality of node devices 200-1 to 200-$n$. For example, the default command may be a command to output (or stop the output of) the content. Here, the predetermined command may be a command related to setting the output of the display of the node device. For example, the command related to setting the output of the display device may include at least one of brightness, contrast, color or resolution. Meanwhile, the predetermined command may not include the default command.

The processor 130 may identify the control command corresponding to the predetermined command in case that the user command includes the predetermined command. The processor 130 may also generate the Ethernet frame including the content and the control command for the control command corresponding to the predetermined command to be executed by the node network 200. The processor 130 may also transmit the provided Ethernet frame to the node network 200.

The processor 130 may transmit only the default command (e.g., provide the content) to the node network 200 in case that the user command does not include the predetermined command. In detail, the processor 130 may generate the Ethernet frame for only the default command to be executed by the node network 200. For example, the processor 130 may generate the Ethernet frame including the content without the control command. The processor 130 may then transmit the provided Ethernet frame to the node network 200.

The description below describes the example (see FIGS. 12 and 16) in which two target node devices are controlled using the multi-node Ethernet frame.

According to an example embodiment, in case that the user command is a command to control each of a first target node device and a second target node device, the processor 130 may store a first control command to control the first target node device in a first node area corresponding to the first target node device among the plurality of node areas included in the data field and a second control command to control the second target node device in a second node area corresponding to the second target node device among the plurality of node areas included in the data field, and generate the Ethernet frame based on the data field including the first control command and the second control command.

Here, it may be assumed that the user command is a command to control two node devices. The two node devices the user wants to control may be described as the first target node device and the second target node device. A command to control the first target node device may be described as the first control command, and a command to control the second target node device may be described as the second control command. In addition, for convenience of explanation, it may be assumed that the first target node device is the first node device 200-1 and the second target node device is the second node device 200-2.

Here, the processor 130 may generate the Ethernet frame based on the data field including the first node area corresponding to the first node device 200-1 and the second node area corresponding to the second node device 200-2.

In addition, the processor 130 may store the first control command in the first node area. The processor 130 may also store the second control command in the second node area.

The processor 130 may then generate the Ethernet frame based on the data field including the first node area where the first control command is stored and the second node area where the second control command is stored.

According to an example embodiment, the first control command and the second control command may be the same as each other. Here, the first control command and the second control command may be only distinguished in that the commands are stored in the separate node areas, and commands to perform substantially the same operation (e.g., setting the brightness to 20%).

As another example, the first control command and the second control command may not be the same as each other. For example, the first control command may be a command to set the brightness to 20% and the second control command may be a command to set the brightness to 50%.

Meanwhile, the Ethernet frame may further include the custom field, and in case that the user command is a command to control one target node device among the plurality of node devices 200-1 to 200-n, the processor 130 may store node address information corresponding to the target node device in the custom field, store the control command to control the target node device in any area of the data field, and generate the Ethernet frame based on the custom field that includes the node address information and the data field that includes the control command.

Here, it may be assumed that the user command is a command to control one node device. In this case, the one node device may be described as the target node device. It may be unnecessary to control the plurality of node devices in case that there is only one target node device. Therefore, there is no need to divide and store the control command for each of the plurality of node areas. Therefore, the processor 130 may store the control command in any area of the data field, unlike a case of controlling the plurality of target node devices. Here, any area of the data field may refer to any area of the control area (or non-content area) included in the data field. Here, the control area may refer to an area that is not the content area where the content is stored, and the area in the data field, where the control command is stored.

Instead of the control command being stored in any area of the data field, the processor 130 may use a node address to clearly indicate in which node device the control command is executed.

In detail, the processor 130 may identify the node address corresponding to the target node device. The processor 130 may then store the identified node address in the custom field. The processor 130 may then generate the Ethernet frame based on the custom field and the data field. The processor 130 may then transmit the provided Ethernet frame to the node network 200.

The electronic apparatus 100 may improve the number and time of data communication in capable of controlling the plurality of node devices 200-1 to 200-n with one Ethernet frame.

FIG. 3 is a view for explaining examples of a method of controlling the plurality of node devices.

Referring to FIG. 3, it may be assumed that the electronic apparatus 100, the first node device 200-1 and the second node device 200-2 are connected to one another by the serial communication.

Referring to an example 310, the electronic apparatus 100 may transmit the content without the control command to the first node device 200-1 and the second node device 200-2.

Here, the electronic apparatus 100 may transmit the Ethernet frame including the content to the first node device 200-1.

Here, the first node device 200-1 may display the content based on the Ethernet frame received from the electronic apparatus 100. In addition, the first node device 200-1 may update the Ethernet frame based on the operation (e.g., content display operation) performed based on the Ethernet frame. The first node device 200-1 may then transmit the updated Ethernet frame (e.g., first feedback frame) to the second node device 200-2.

Here, the second node device 200-2 may display the content based on the Ethernet frame (e.g., first feedback frame) received from the first node device 200-1. In addition, the second node device 200-2) may update the Ethernet frame (e.g., first feedback frame) based on the operation (e.g., content display operation) performed based on the Ethernet frame (e.g., first feedback frame). The second node device 200-2 may then transmit the updated Ethernet frame (e.g., second feedback frame) to the electronic apparatus 100. Here, the second node device 200-2 may transmit the updated Ethernet frame (e.g., second feedback frame) to the electronic apparatus 100 in the reverse direction (or reverse path). For example, the second node device 200-2 may transmit the updated Ethernet frame (e.g., second feedback frame) to the first node device 200-1, and the first node device 200-1 may retransmit the updated Ethernet frame (e.g., second feedback frame) to the electronic apparatus 100. As a result, the second node device 200-2 may transmit the Ethernet frame (e.g., second feedback frame) to the electronic apparatus 100.

Here, the electronic apparatus 100 may identify the integrities of the execution results of the operations performed by the first node device 200-1 and the second node device 200-2 (e.g., content display operation performed by the first node device 200-1 and content display operation performed by the second node device 200-2), based on the Ethernet frame (e.g., second feedback frame) received from the second node device 200-2.

Referring to another example 320, the electronic apparatus 100 may transmit the content and the control command (e.g., control command to lower the brightness of the display included in the second node device 200-2) executed by the second node device 200-2 to the first node device 200-1 and the second node device 200-2.

Here, the electronic apparatus 100 may transmit the Ethernet frame including the content and the control command to the first node device 200-1.

Here, the first node device 200-1 may display the content based on the Ethernet frame received from the electronic apparatus 100. In addition, the first node device 200-1 may update the Ethernet frame based on the operation (e.g., content display operation) performed based on the Ethernet frame. The first node device 200-1 may then transmit the updated Ethernet frame (e.g., first feedback frame) to the second node device 200-2.

Here, the second node device 200-2 may display the content based on the Ethernet frame (e.g., first feedback frame) received from the first node device 200-1, and perform an operation (e.g., operation of lowering the brightness of the display included in the second node device 200-2) corresponding to the control command. In addition, the second node device 200-2 may update the Ethernet frame (e.g., first feedback frame) based on the operations (e.g., content display operation and operation of lowering the brightness of the display included in the second node device 200-2) performed based on the Ethernet frame (e.g., first feedback frame). The second node device 200-2 may then transmit the updated Ethernet frame (e.g., second feedback frame) to the electronic apparatus 100. Here, the second node device 200-2 may transmit the updated Ethernet frame (e.g., second feedback frame) to the electronic apparatus 100 in the reverse direction (or reverse path). A description related to this configuration is described in the example 310, and a redundant description is omitted.

Here, the electronic apparatus 100 may identify the integrities of the execution results of the operations performed by the first node device 200-1 and the second node device 200-2 (e.g., content display operation performed by the first node device 200-1 and content display operation and operation of lowering the brightness of the display included in the second node device 200-2), based on the Ethernet frame (e.g., second feedback frame) received from the second node device 200-2.

Referring to yet another example 330, the electronic apparatus 100 may transmit, to the first node device 200-1 and the second node device 200-2, the content, the first control command executed by the first node device 200-1 (e.g., control command to lower the brightness of the display included in the first node device 200-1), and the second control command executed by the second node device 200-2 (e.g., control command to lower the brightness of the display included in the second node device 200-2).

Here, the electronic apparatus 100 may transmit the Ethernet frame including the content, the first control command and the second control command to the first node device 200-1.

Here, the first node device 200-1 may display the content based on the Ethernet frame received from the electronic apparatus 100, and perform an operation (e.g., operation of lowering the brightness of the display included in the first node device 200-1) corresponding to the first control command. In addition, the first node device 200-1 may update the Ethernet frame based on the operation (e.g., operation of displaying the content and operation of lowering the brightness of the display included in the first node device 200-1) performed based on the Ethernet frame. The first node device 200-1 may then transmit the updated Ethernet frame (e.g., first feedback frame) to the second node device 200-2.

Here, the second node device 200-2 may display the content based on the Ethernet frame (e.g., first feedback frame) received from the first node device 200-1, and perform the operation (e.g., operation of lowering the brightness of the display included in the second node device 200-2) corresponding to the second control command. In addition, the second node device 200-2 may update the Ethernet frame (e.g., first feedback frame) based on the operations (i.e., content display operation and operation of lowering the brightness of the display included in the second node device 200-2) performed based on the Ethernet frame (e.g., first feedback frame). The second node device 200-2 may then transmit the updated Ethernet frame (e.g., second feedback frame) to the electronic apparatus 100. Here, the second node device 200-2 may transmit the updated Ethernet frame (e.g., second feedback frame) to the electronic apparatus 100 in the reverse direction (or reverse path). A description related to this configuration is described in the example 310, and the redundant description is omitted.

Here, the electronic apparatus 100 may identify the integrities of the execution results of the operations performed by the first node device 200-1 and the second node device 200-2 (i.e., content display operation performed by the first node device 200-1, content display operation performed by the second node device 200-2, operation of lowering the brightness of the display included in first node device 200-1, and operation of lowering the brightness of the display included in the second node device 200-2), based on the Ethernet frame (e.g., second feedback frame) received from the second node device 200-2.

Figure 4:
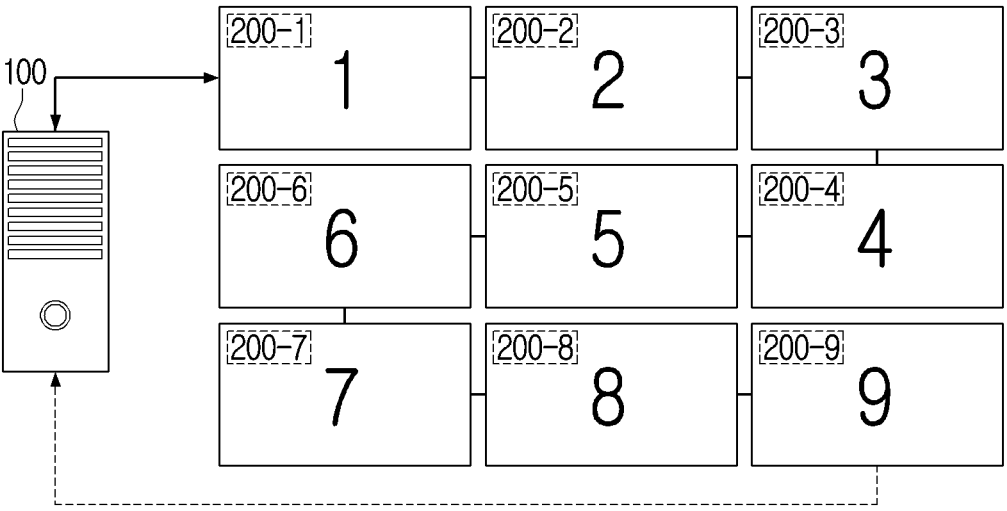
FIG. 4 is a view illustrating a situation where the plurality of node devices are implemented as a display module according to an example embodiment of the disclosure.

FIG. 4 is a view for explaining a situation where the node network 200 is implemented as a display module according to an example embodiment.

Referring to FIG. 4, the electronic apparatus 100 may be connected to the plurality of node devices 200-1 to 200-n by the serial communication. According to an example embodiment, the electronic apparatus 100 may be connected to the first node device 200-1, the second node device 200-2, the third node device 200-3, the fourth node device 200-4, the fifth node device 200-5, the sixth node device 200-6, the seventh node device 200-7, the eighth node device 200-8 and the ninth node device 200-9 in the sequence. However, the disclosure is not limited to nine node devices. For example, the electronic apparatus 100 and the first node device 200-1 may be connected to each other by one Ethernet line. As another example, the electronic apparatus 100 and the first node device 200-1 may be connected to each other through one Ethernet line (e.g., first Ethernet line), and the ninth node device 200-9 may be connected in series with the electronic apparatus 100 through another Ethernet line (e.g., second Ethernet line). Here, the node device may be a display module.

Here, the electronic apparatus 100 may transmit the Ethernet frame to the plurality of display modules by using the serial communication. The plurality of display modules may then display the content transmitted from the electronic apparatus 100 according to a predetermined method. In addition, at least one display module among the plurality of display modules may execute the control command transmitted from the electronic apparatus 100. For example, at least one display module among the plurality of display modules may lower the brightness of the display module based on the control command transmitted from the electronic apparatus 100.

Figure 5:
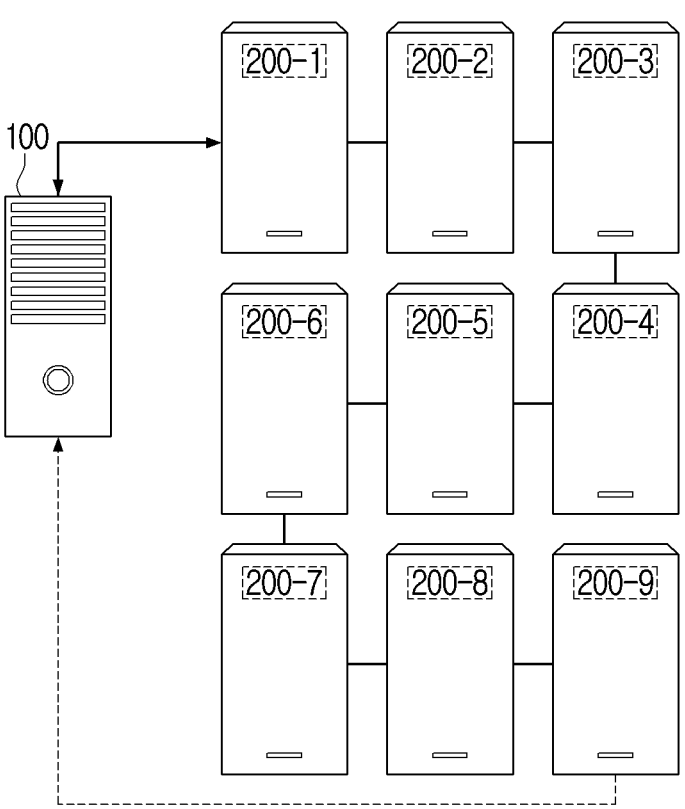
FIG. 5 is a view illustrating a situation where the plurality of node devices are implemented as a speaker according to an example embodiment of the disclosure.

FIG. 5 is a view for explaining a situation where the node network 200 is implemented as a speaker according to another example embodiment.

Referring to FIG. 5, the electronic apparatus 100 may be connected to the plurality of node devices 200-1 to 200-9 by the serial communication. The serial connection sequence is the same as that of FIG. 4, and a redundant description is omitted. Here, the node device may a speaker.

Here, the electronic apparatus 100 may transmit the Ethernet frame to a plurality of speakers by using the serial communication. The plurality of speakers may then output the content transmitted from the electronic apparatus 100 according to a predetermined method. In addition, at least one speaker among the plurality of speakers may execute the control command transmitted from the electronic apparatus 100. For example, at least one speaker among the plurality of speakers may lower a volume of the speaker based on the control command transmitted from the electronic apparatus 100.

Figure 6:
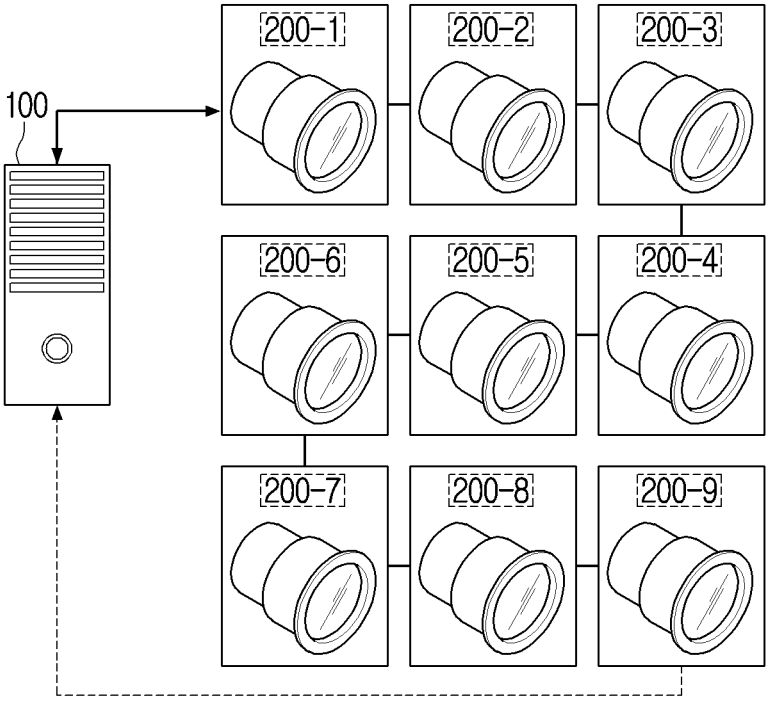
FIG. 6 is a view illustrating a situation where the plurality of node devices are implemented as a lighting device according to an example embodiment of the disclosure.

FIG. 6 is a view for explaining a situation where the node network 200 is implemented as a lighting device according to another example embodiment.

Referring to FIG. 6, the electronic apparatus 100 may be connected to the plurality of node devices 200-1 to **200-*n* by the serial communication. The serial connection sequence is the same as that of FIG. 4**, and the redundant description is omitted. Here, the node device may be a lighting device.

Here, the electronic apparatus 100 may transmit the Ethernet frame to a plurality of lighting devices by using the serial communication. The plurality of lighting devices may then output the content transmitted from the electronic apparatus 100 according to a predetermined method. In addition, at least one lighting device among the plurality of lighting devices may execute the control command transmitted from the electronic apparatus 100. For example, at least one lighting device among the plurality of lighting devices may lower illuminance of the lighting device based on the control command transmitted from the electronic apparatus 100.

FIG. 7 is a diagram for explaining examples of the Ethernet frame.

Referring to FIG. 7, the Ethernet frame may be implemented as a single-node Ethernet frame 710 (FIG. 7) or a multi-node Ethernet frame 720 (FIG. 7). The single-node Ethernet frame 710 may be a frame in which data (or commands) that are transmitted to the plurality of nodes are stored in a data field 716 without distinction for each node. On the other hand, the multi-node Ethernet frame 720 may be a frame in which a data field 726 has an area corresponding (or assigned) to each of the plurality of nodes, and data that need to be transmitted to a specific node are stored in an area corresponding (or assigned) to the specific node.

Referring to the example 701 of FIG. 7, the electronic apparatus 100 may provide the single-node Ethernet frame 710. Here, the single-node Ethernet frame 710 may include at least one of a preamble field 711, a starting frame delimiter (SFD) field 712, a first custom field 713, a second custom field 714, a type field 715, the data field 716, a cyclic redundancy check (CRC) field 717 or an inter frame gap (IFG) field 718.

Here, the preamble field 711 may be a field for bit synchronization of a receiver and a transmitter. In addition, the preamble field 711 may be 7 bytes long.

Here, the SFD field 712 may be a field for notifying start of a frame. In addition, the SFD field 712 may be 1 byte long.

Here, the first custom field 713 may include at least one of an address code area 713-1 or a target node address area 713-2. In addition, the first custom field 713 may be 6 bytes long. Here, the address code area 713-1 may be an area where address code information for controlling the address of at least one node device among the plurality of node devices 200-1 to **200-*n* connected to the electronic apparatus is stored. For example, the address code information may include at least one of a code that does not change the address, a code that initializes the address or a code that sets the address to a new value. For example, the address code area 713-1 may include a control command ADDR_CMD. In addition, the address code area 713-1 may be 1 byte long. Here, the target node address area 713-2 may be an area where target node address information for executing the control command is stored. The plurality of node devices 200-1 to 200-*n* may identify which node the control command of the user is to be transmitted based on the target node address information. For example, the target node address area 713-2 may include a destination address. For example, the target node address area 713-2 may store only an address corresponding to one target node. For another example, the target node address area 713-2 may store addresses corresponding to the plurality of target nodes. In addition, the target node address area 713-2** may be 5 bytes long.

Here, the second custom field 714 may include at least one of a control code area 714-1 or a registry address area 714-2. In addition, the second custom field 714 may be 6 bytes long. Here, the control code area 714-1 may be an area where the control code information on at least one of the number or transmission method of the target node devices is stored. For example, the control code area 714-1 may include a control command CTRL_CMD. In addition, the control code area 714-1 may be 1 byte long. Here, the registry address area 714-2 may be an area where registry address information of a node device used for executing the control command is stored. For example, the registry address area 714-2 may include a registry address REG_ADDR. In addition, the registry address area 714-2 may be 5 bytes long.

Here, the type field 715 may be a field for indicating a packet type of an upper protocol. In addition, the type field 715 may be 2 bytes long.

Here, the data field 716 may be a field for storing the data transmitted to the plurality of node devices 200-1 to **200-*n*. In addition, the data field 716 may be 42 bytes to 1500 bytes long. Meanwhile, 42 bytes, i.e., minimum byte size, may here be replaced by 46 bytes. Here, the data field 716 may refer to a payload. Here, the data field 716 may include at least one of a content area 716-0, a first burst area 716-1, a second burst area 716-2, a third burst area 716-3, . . . or an n-th burst area 716-*n*. Here, the content area 716-0 may be an area where the contents transmitted to the plurality of node devices 200-1 to 200-*n* are stored. Here, each of the plurality of burst areas 716-1 to 716-*n*** may be an area where the control command is stored. The burst area may be described as a data area or the like depending on an implemented example although described here as the burst area.

Here, the CRC field 717 may be a field for checking the integrity of the result of the operation performed by the node device. In detail, the CRC field 717 may be an area where the feedback code is stored. In addition, the CRC field 717 may be 4 bytes long.

Here, the IFG field 718 may be a field for defining a time interval for transmitting the frame. In addition, the IFG field 718 may be 12 bytes long.

Meanwhile, referring to the example 702 of FIG. 7, the electronic apparatus 100 may provide the multi-node Ethernet frame 720. Here, the multi-node Ethernet frame 720 may have the same structure as the single-node Ethernet frame 710. However, the data field 726 of the multi-node Ethernet frame 720 may be different from the data field 716 of the single-node Ethernet frame 710.

In detail, the data field 726 of the multi-node Ethernet frame 720 may include at least one of the content area 726-0, the first node area 726-1, the second node area 726-2, the third node area 726-3, . . . or the n-th node area 726-n. Here, the content area 726-0 may be the area where the contents transmitted to the plurality of node devices 200-1 to 200-n are stored. Here, each of the plurality of node areas 726-1 to 726-n may be an area corresponding to each of the plurality of node devices 200-1 to 200-n. In addition, each of the plurality of node areas 726-1 to 726-n may be an area where the control commands each corresponding to the plurality of node devices 200-1 to 200-n are stored.

Meanwhile, FIG. 7 shows that the content area is included in the data field. However, in a situation where the content does not need to be provided, the electronic apparatus 100 may generate the Ethernet frame based on the data field where the content area is not included.

FIG. 8 is a table for explaining the control code information according to an example embodiment.

Referring to FIG. 8, the table 805 may represent various types of control codes. However, the disclosure is not limited thereto, and as such, according to another example embodiment, other control codes may further exist in addition to the control codes described in the table 805.

Here, "0000_0000" code may be a code indicating a situation where there is no control command. Here, the operation to display the content may be an operation performed all the time rather than an operation performed by the control command. Therefore, the plurality of node devices 200-1 to 200-n may perform the content display operation even in case of identifying the code "0000_0000."

Here, "0000_0001" code may be a code indicating that a write operation is performed by one target node in the normal mode.

Here, "0000_0010" code may be a code indicating that a read operation is performed by one target node in the normal mode.

Here, "0000_0011" code may be a code indicating that the write operation is performed by one target node in the burst mode. Here, the burst mode may refer to a mode in which the data stored in the plurality of unit areas are continuously transmitted by one request.

Here, "0000_0100" code may be a code indicating that the read operation is performed by one target node in the burst mode.

Here, "1000_0001" code may be a code indicating that the write operations are performed by the plurality of target nodes.

Here, "1000_0010" code may be a code indicating that the read operations are performed by the plurality of target nodes.

Here, the normal mode may refer to any of the various data transmission methods. For example, the normal mode may refer to the method of transmitting the data based on at least one of the predetermined packet unit or the predetermined time unit.

Here, the burst mode may be the method of continuously transmitting data without interruption as long as there is no interruption. The burst mode may transmit the data faster than the normal mode. The burst mode may be used in case that the data size is small or communication time is short. In addition, the burst mode may refer to an operation mode in which the predetermined number (or predetermined burst size or predetermined burst length) of data is serially transmitted or received. In addition, the burst mode may refer to a mode in which the predetermined number of data is aligned with successive clock cycles for the read operation or the write operation to be performed.

Here, WR may be a description corresponding to the write operation. In addition, RD may be a description corresponding to the read operation.

Figure 9:
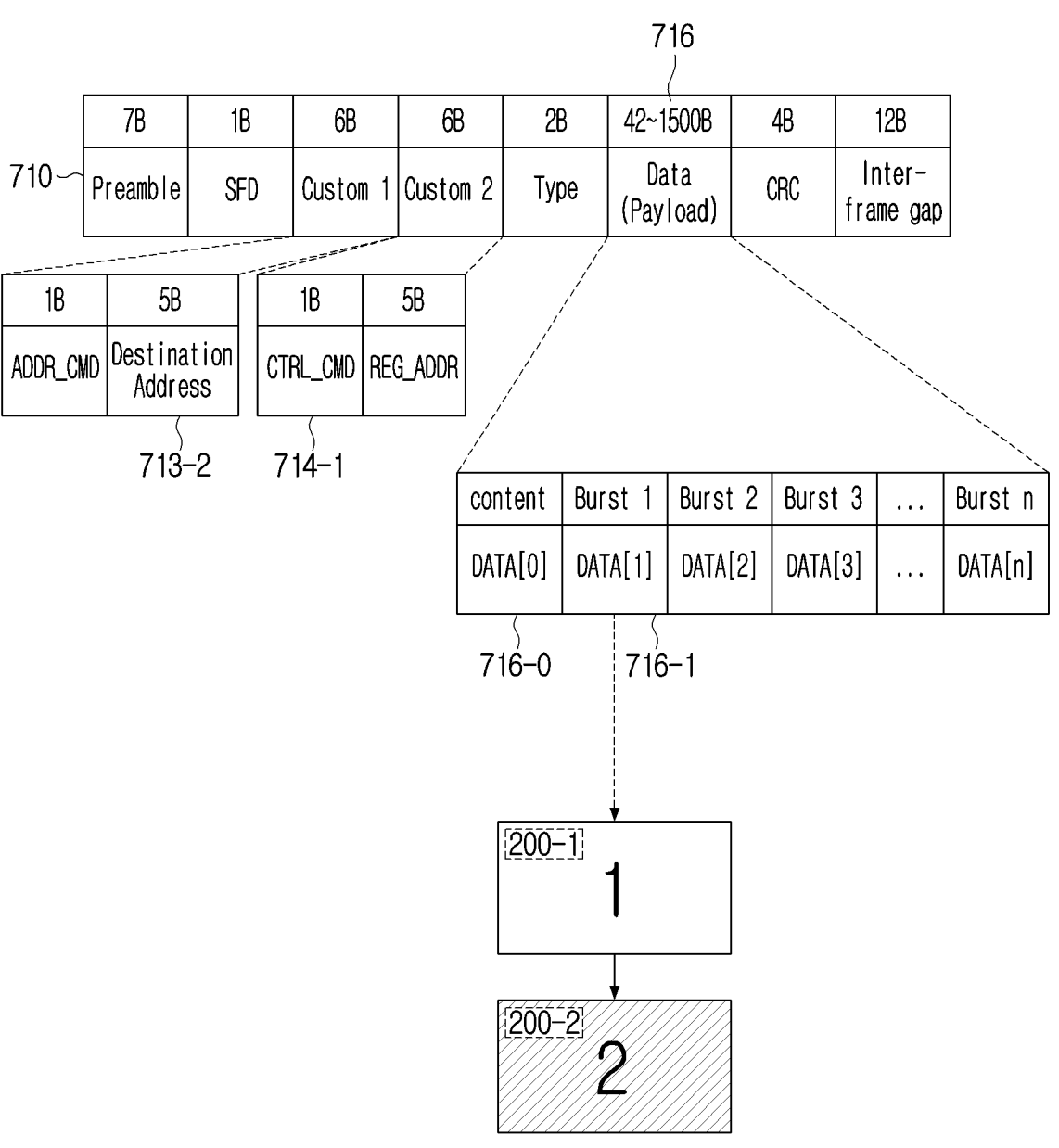
FIG. 9 is a view for explaining an operation of controlling one target node device through a single-node Ethernet frame structure according to an example embodiment of the disclosure.

FIG. 9 is a view for explaining an operation of controlling one target node device through a single-node Ethernet frame structure according to an example embodiment.

Referring to FIG. 9, the electronic apparatus 100 may control the second node device 200-2 by using the single-node Ethernet frame 710. For example, assume the example 320 of FIG. 3. The electronic apparatus 100 may transmit the control command to control the second node device 200-2.

Here, the electronic apparatus 100 may determine the target node as the second node device 200-2. In addition, the electronic apparatus 100 may determine a target node address as the address of the second node device 200-2. In addition, the electronic apparatus 100 may store the address of the second node device 200-2 in the target node address area 713-2.

Here, the electronic apparatus 100 may determine the number of target nodes as one (1). In addition, the electronic apparatus 100 may determine the transmission method as the normal mode. In addition, the electronic apparatus 100 may determine the number of target nodes as one (1), and identify the control code whose transmission method is the burst mode. The electronic apparatus 100 may then store the identified control code in the control code area 714-1.

Here, the electronic apparatus 100 may determine the content to be transmitted to the first node device 200-1 and the second node device 200-2. The electronic apparatus 100 may then store the determined content in the content area 716-0.

Here, the electronic apparatus 100 may determine the control command to be transmitted to the second node device 200-2. The electronic apparatus 100 may then store the determined control command in the first burst area 716-1.

Here, the electronic apparatus 100 may provide the single-node Ethernet frame 710 including the target node address area 713-2 where the address of the second node device 200-2 is stored, the control code area 714-1 where the identified control code is stored, the content area 716-0 where the determined content is stored, and the first burst area 716-1 where the determined control command is stored.

Here, the electronic apparatus 100 may transmit the single-node Ethernet frame 710 to the first node device 200-1. Here, the first node device 200-1 may update the single-node Ethernet frame 710 received from the electronic apparatus 100, and then transmit the updated Ethernet frame 710 to the second node device 200-2.

Here, the first node device 200-1 and the second node device 200-2 may each display the content stored in the content area 716-0.

Here, the first node device 200-1 may ignore the control command stored in the first burst area 716-1. The reason is that the address stored in the target node address area 713-2 is not the address of the first node device 200-1.

Here, the second node device 200-2 may perform the control operation based on the control command stored in the first burst area 716-1.

Figure 10:
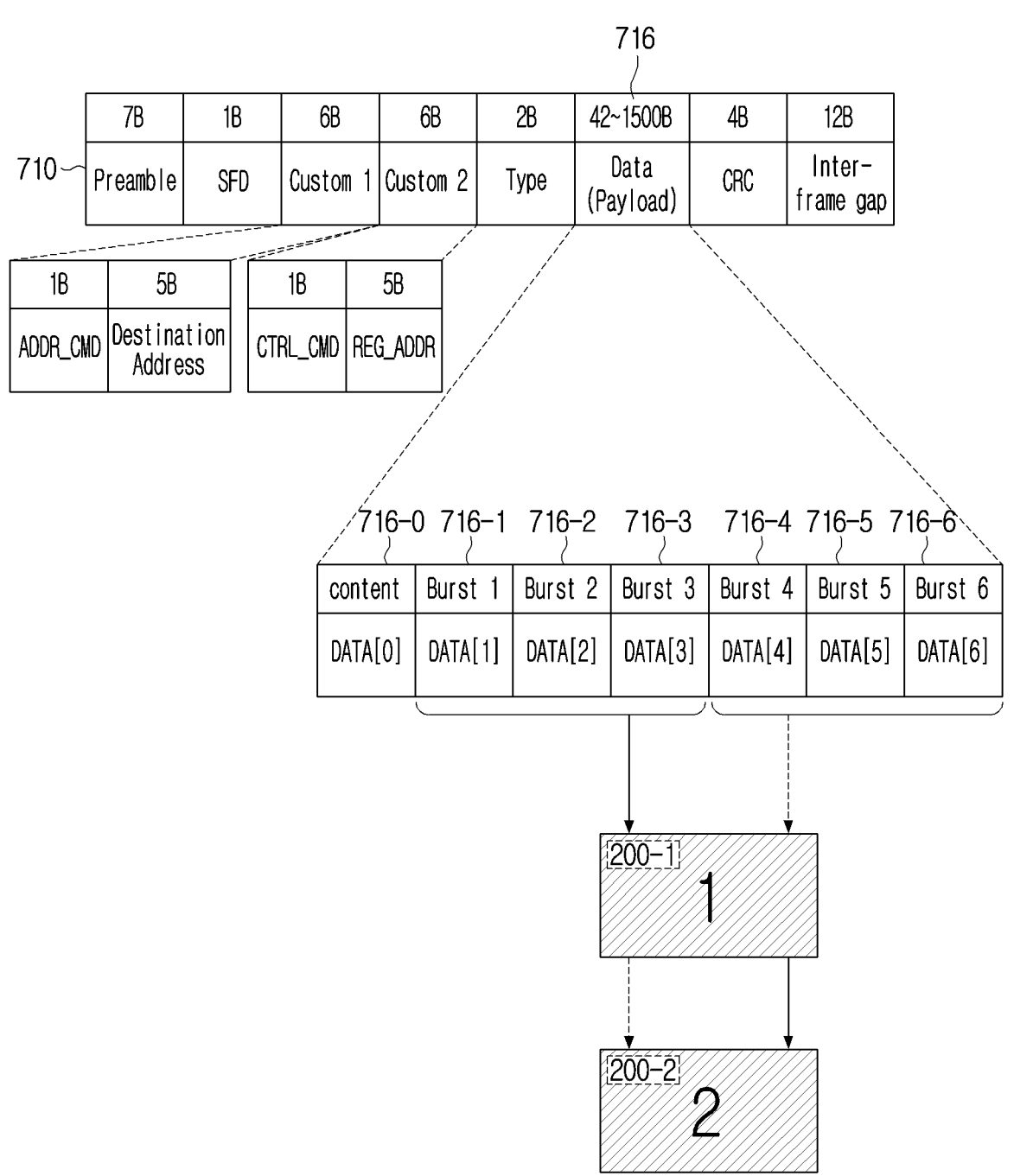
FIG. 10 is a view for explaining an operation of controlling the plurality of target node devices through the single-node Ethernet frame structure according to an example embodiment of the disclosure.

FIG. 10 is a view for explaining an operation of controlling the plurality of target node devices through the single-node Ethernet frame structure according to an example embodiment.

Referring to FIG. 10, the electronic apparatus 100 may control the first node device 200-1 and the second node device 200-2 by using the single-node Ethernet frame 710. For example, assume the example 330 of FIG. 3. The electronic apparatus 100 may transmit the first control command to control the first node device 200-1 and the second control command to control the second node device 200-2.

Here, the data field 716 may include the content area 716-0, the first burst area 716-1, the second burst area 716-2, the third burst area 716-3, the fourth burst area 716-4, the fifth burst area 716-5 and the sixth burst area 716-6.

Here, the electronic apparatus 100 may store the content to be displayed by the first node device 200-1 and the second node device 200-2 in the content area 716-0.

Here, the electronic apparatus 100 may store information on the first control command to be executed by the first node device 200-1 in at least one area of the first burst area 716-1, the second burst area 716-2 or the third burst area 716-3.

Here, the electronic apparatus 100 may store information on the second control command to be executed by the second node device 200-2 in at least one area of the fourth burst area 716-4, the fifth burst area 716-5, or the sixth burst area 716-6.

The plurality of node devices 200-1 to 200-n may identify in advance that the information stored in at least one area of the first to third burst areas 716-1 to 716-3 is for the first node device 200-1, and the information stored in at least one area of the fourth to sixth burst areas 716-4 to 716-6 is for the second node device 200-2. For example, a regulation assigned to each node device in units of three areas out of the plurality of burst areas may be stored in advance in the electronic apparatus 100 and the plurality of node devices 200-1 to 200-n.

Here, the electronic apparatus 100 may provide the single-node Ethernet frame 710 based on the content area 716-0 where the content is stored and the first to sixth burst areas 716-1 to 716-6 where the first control command and the second control command are stored.

Here, the electronic apparatus 100 may transmit the single-node Ethernet frame 710 to the first node device 200-1. Here, the first node device 200-1 may update the single-node Ethernet frame 710 received from the electronic apparatus 100, and then transmit the updated Ethernet frame 710 to the second node device 200-2.

Here, the first node device 200-1 and the second node device 200-2 may each display the content stored in the content area 716-0.

Here, the first node device 200-1 may perform the control operation based on the first control command stored in at least one area of the first to third burst areas 716-1 to 716-3.

Here, the second node device 200-2 may perform the control operation based on the second control command stored in at least one area of the fourth to sixth burst areas 716-4 to 716-6.

Figure 11:
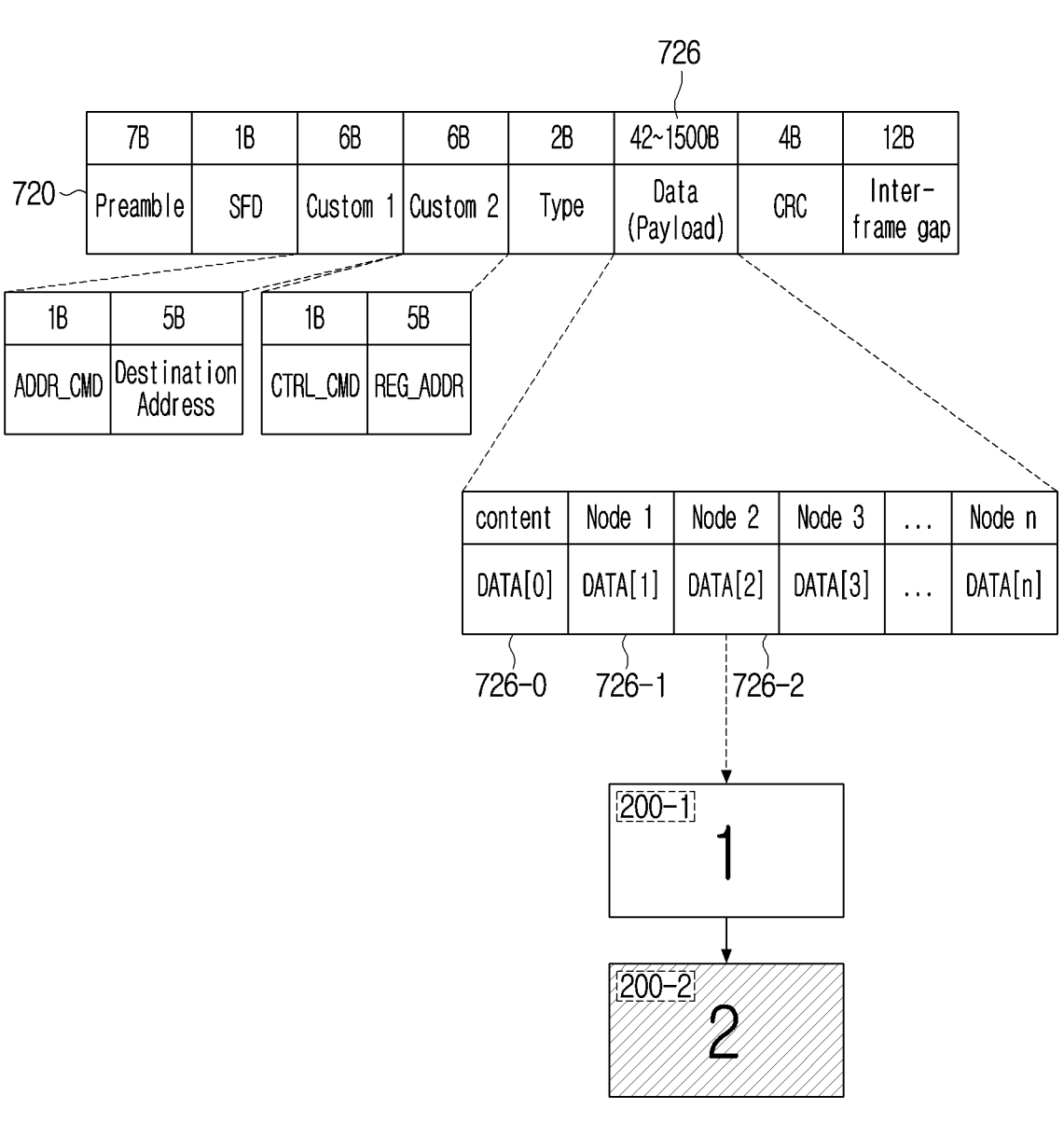
FIG. 11 is a view for explaining an operation of controlling one target node device through a multi-node Ethernet frame structure according to an example embodiment of the disclosure.

FIG. 11 is a view for explaining an operation of controlling one target node device through a multi-node Ethernet frame structure according to an example embodiment.

Referring to FIG. 11, the electronic apparatus 100 may control the second node device 200-2 by using the multi-node Ethernet frame 720. For example, assume the example 320 of FIG. 3. The electronic apparatus 100 may transmit the control command to control the second node device 200-2.

Here, the electronic apparatus 100 may determine the content to be transmitted to the first node device 200-1 and the second node device 200-2. The electronic apparatus 100 may then store the determined content in the content area 726-0.

Here, the electronic apparatus 100 may determine the control command to be transmitted to the second node device 200-2. The electronic apparatus 100 may then store the determined control command in the second node area 726-2.

Here, the electronic apparatus 100 may provide the multi-node Ethernet frame 720 based on the content area 726-0 where the determined content is stored and the second node area 726-2 where the control command is stored.

Here, the electronic apparatus 100 may transmit the multi-node Ethernet frame 720 to the first node device 200-1. Here, the first node device 200-1 may update the multi-node Ethernet frame 720 received from the electronic apparatus 100, and then transmit the updated Ethernet frame 720 to the second node device 200-2.

Here, the first node device 200-1 and the second node device 200-2 may each display the content stored in the content area 726-0.

Here, the first node device 200-1 may not perform a separate control operation other than the content display operation. The reason is that the control command is not stored in the first node area 726-1 corresponding to the first node device 200-1.

Here, the second node device 200-2 may perform the control operation based on the control command stored in the first node area 726-2.

Figure 12:
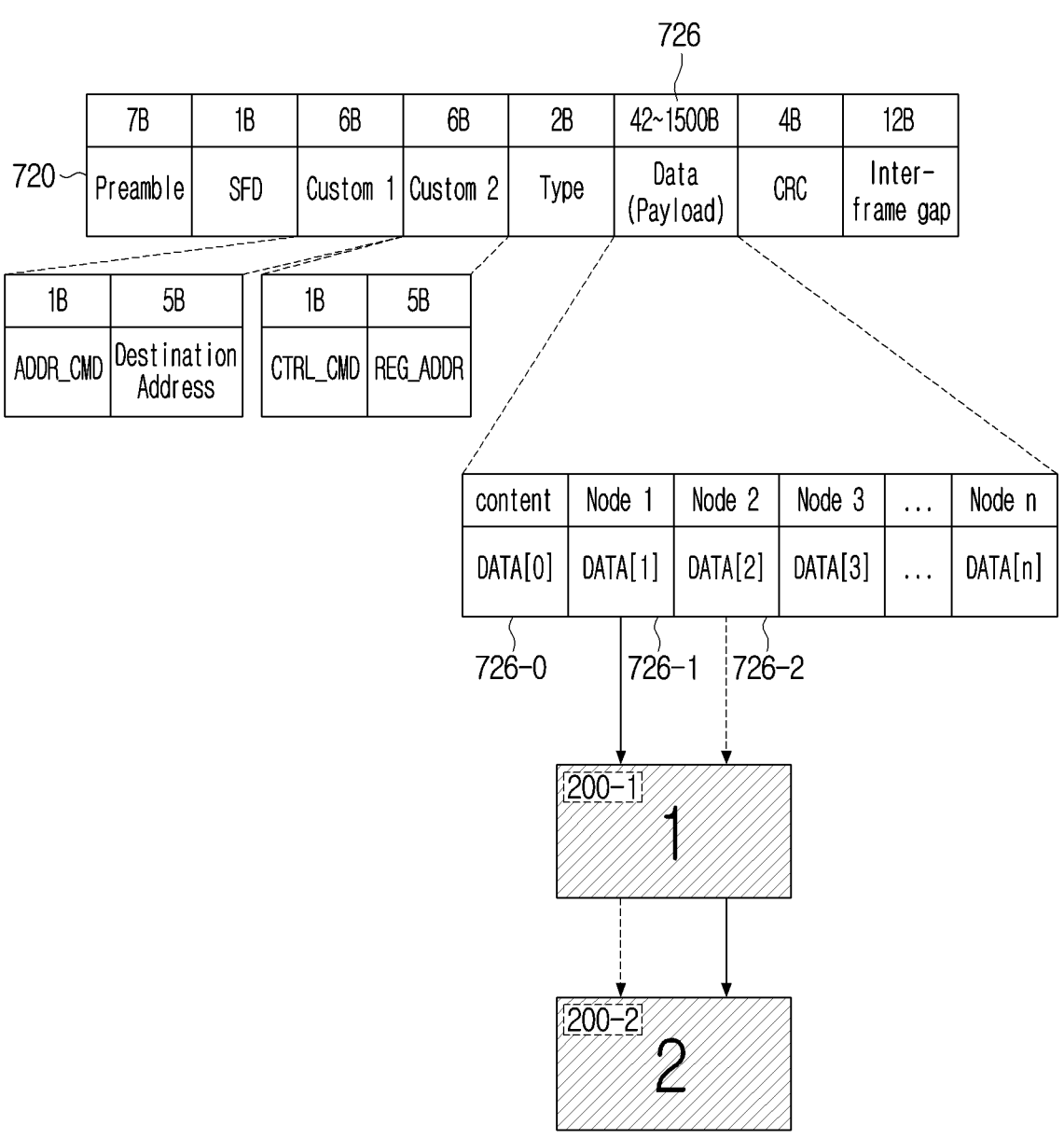
FIG. 12 is a view for explaining an operation of controlling the plurality of target node devices through the multi-node Ethernet frame structure according to an example embodiment of the disclosure.

FIG. 12 is a view for explaining an operation of controlling the plurality of target node devices through the multi-node Ethernet frame structure according to an example embodiment.

Referring to FIG. 12, the electronic apparatus 100 may control the first node device 200-1 and the second node device 200-2 by using the multi-node Ethernet frame 720. For example, assume the example 330 of FIG. 3. The electronic apparatus 100 may transmit the first control command to control the first node device 200-1 and the second control command to control the second node device 200-2.

Here, the electronic apparatus 100 may determine the content to be transmitted to the first node device 200-1 and the second node device 200-2. The electronic apparatus 100 may then store the determined content in the content area 726-0.

Here, the electronic apparatus 100 may determine the first control command to be transmitted to the first node device 200-1 and the second control command to be transmitted to the second node device 200-2. The electronic apparatus 100 may then store the first control command in the first node area 726-1 and the second control command in the second node area 726-2.

Here, the electronic apparatus 100 may provide the multi-node Ethernet frame 720 based on the content area 726-0 where the determined content is stored, the first node area 726-1 where the first control command is stored, and the second node area 726-2 where the second control command is stored.

Here, the electronic apparatus 100 may transmit the multi-node Ethernet frame 720 to the first node device 200-1. Here, the first node device 200-1 may update the multi-node Ethernet frame 720 received from the electronic apparatus 100, and then transmit the updated Ethernet frame 720 to the second node device 200-2.

Here, the first node device 200-1 and the second node device 200-2 may each display the content stored in the content area 726-0.

Here, the first node device 200-1 may perform the control operation based on the first control command stored in the first node area 726-1.

Here, the second node device 200-2 may perform the control operation based on the second control command stored in the second node area 726-2.

Figure 13:
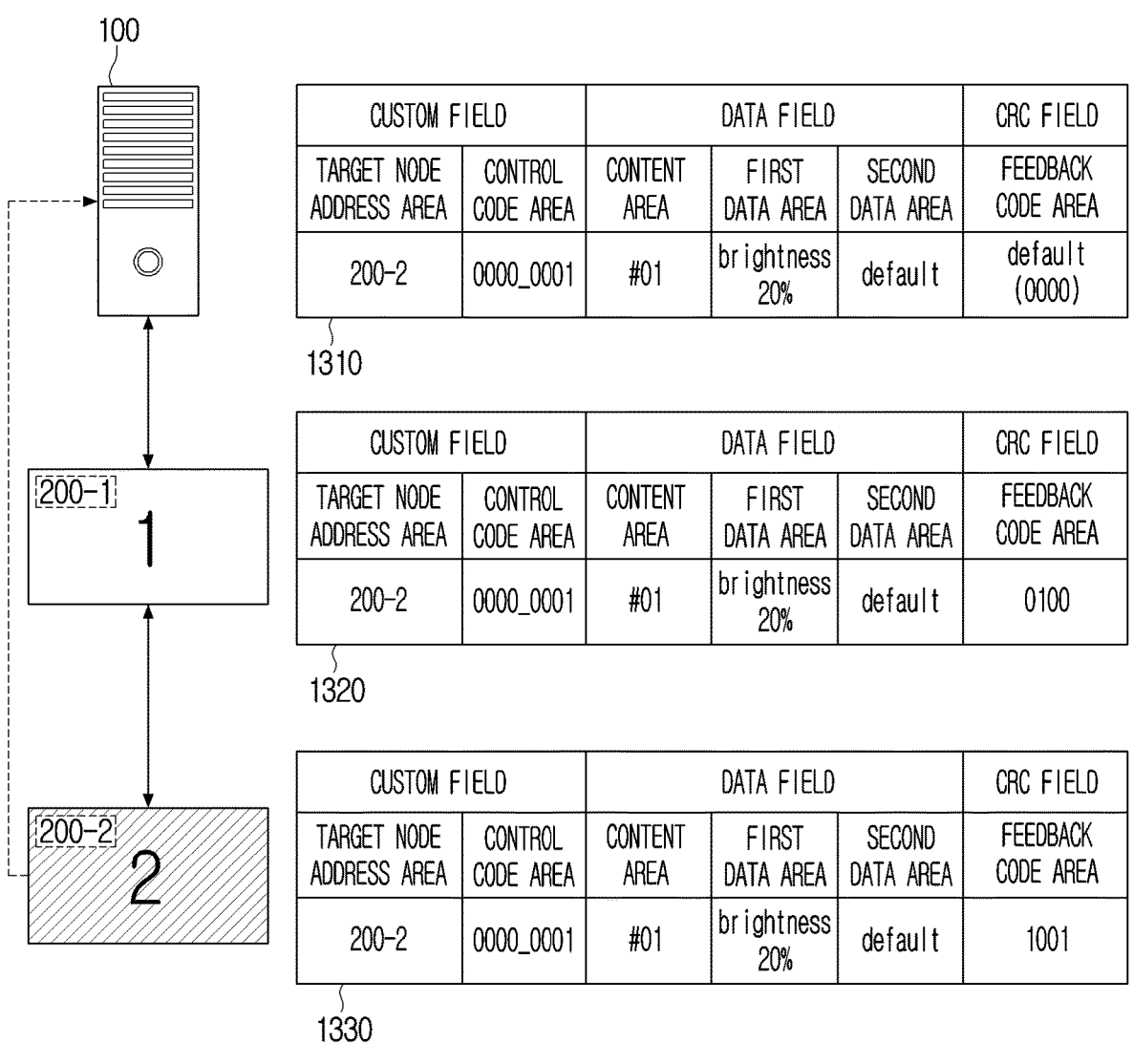
FIG. 13 is a view for explaining an operation of updating the Ethernet frame based on the operation of controlling one target node device through the single-node Ethernet frame structure according to an example embodiment of the disclosure.

FIG. 13 is a view for explaining an operation of updating the Ethernet frame based on the operation of controlling one target node device through the single-node Ethernet frame structure according to an example embodiment.

Referring to FIG. 13, the electronic apparatus 100 may control the second node device 200-2 by using a single-node Ethernet frame 1310. For example, assume the example 320 of FIG. 3. The electronic apparatus 100 may transmit the control command to control the second node device 200-2.

Here, the single-node Ethernet frame 1310 may include the custom field, the data field and the CRC field. Here, the custom field may include the target node address area and the control code area. Here, the data field may include the content area, the first data area and the second data area. Here, the CRC field may include a feedback code area.

Here, the electronic apparatus 100 may provide the single-node Ethernet frame 1310 based on the target node address area where the target node address "200-2" is stored, the control code area where the control code "0000_0001" is stored, the content area where the content "#01" is stored, the first data area where the control command "brightness 20%" is stored, and the feedback code area where the feedback code "0000" is stored.

Here, the electronic apparatus 100 may transmit the provided single-node Ethernet frame 1310 to the first node device 200-1.

The first node device 200-1 may then receive the single-node Ethernet frame 1310. In addition, the first node device 200-1 may display the content "#01" based on the content area included in the single-node Ethernet frame 1310. Here, the first node device 200-1 may not perform an additional operation other than the content display operation because the target node address "200-2" does not match its own address. Here, the first node device 200-1 may update (or change) the feedback code based on the result of the content display operation. In detail, the first node device 200-1 may update the feedback code "0000" included in the single-node Ethernet frame 1310, based on the predefined function.

Here, the predefined function may be a function that is increased by "four (4)" in case that the content is displayed, and increased by "one (1)" in case that the control command is executed.

The first node device 200-1 may perform the content display operation, and thus allow the feedback code "0000" of the single-node Ethernet frame 1310 to be increased by "four (4)" to be updated as the feedback code "0100." In addition, the first node device 200-1 may provide a first feedback frame 1320 based on the updated feedback code "0100." Here, the first feedback frame 1320 may be a frame updated from the single-node Ethernet frame 1310. In addition, the first node device 200-1 may transmit the first feedback frame 1320 to the second node device 200-2.

The second node device 200-2 may then receive the first feedback frame 1320. In addition, the second node device 200-2 may display the content "#01" based on the content area included in the first feedback frame 1320. Here, the second node device 200-2 may perform an additional operation corresponding to the control command in addition to the content display operation because the target node address "200-2" matches its own address. In detail, the second node device 200-2 may execute the control command "brightness 20%" stored in the first data area. Here, the second node device 200-2 may update (or change) the feedback code based on the results of the content display operation and the operation corresponding to the control command. In detail, the second node device 200-2 may update the feedback code "0100" included in the first feedback frame 1320, based on the predefined function.

The second node device 200-2 may perform the content display operation and the operation corresponding to the control command, and thus allow the feedback code "0100" of the first feedback frame 1320 to be increased by "five (5)" to be updated as the feedback code "1001." The second node device 200-2 may provide a second feedback frame 1330 based on the updated feedback code "1001." Here, the second feedback frame 1330 may be a frame updated from the first feedback frame 1320. In addition, the second node device 200-2 may transmit the second feedback frame 1330 to the electronic apparatus 100. Here, the second node device 200-2 may transmit the second feedback frame 1330 to the electronic apparatus 100 in the reverse direction (or reverse path). For example, the second node device 200-2 may transmit the second feedback frame 1330 to the first node device 200-1, and the first node device 200-1 may retransmit the second feedback frame 1330 to the electronic apparatus 100. As a result, the second node device 200-2 may transmit the second feedback frame 1330 to the electronic apparatus 100.

Here, the electronic apparatus 100 may identify the integrities of the results of the operations performed by the first node device 200-1 and the second node device 200-2 based on the second feedback frame 1330 received from the second node device 200-2.

A size of the feedback code increased based on the type of control command may depend on the implemented example. For example, the size of the feedback code may be increased by "one (1)" in case that the control command to lower the brightness is normally executed, and the size of the feedback code may be increased by "two (2)" in case that the control command to turn off power is normally executed.

In addition, a size of the feedback code increased based on the node device executing the control command may depend on the implemented example. For example, the size of the feedback code may be increased by "one (1)" in case that the control command is normally executed by the first node device 200-1, and the size of the feedback code may be increased by "two (2)" in case that the control command is normally executed by the second node device 200-2.

Therefore, the electronic apparatus 100 may check whether the control command is normally executed, and may also check at which stage the error occurs, based on a final value of the feedback code.

FIG. 14 is a view for explaining an operation of updating the Ethernet frame based on the operation of controlling the plurality of target node devices through the single-node Ethernet frame structure according to an example embodiment.

Referring to FIG. 14, the electronic apparatus 100 may control the first node device 200-1 and the second node device 200-2 by using the single-node Ethernet frame 710. For example, assume the example 330 of FIG. 3. The electronic apparatus 100 may transmit the first control command to control the first node device 200-1 and the second control command to control the second node device 200-2.

Here, a single-node Ethernet frame 1410 may include the custom field, the data field and the CRC field. Here, the custom field may include the target node address area and the control code area. Here, the data field may include the content area, the first data area and the second data area. Here, the CRC field may include the feedback code area.

Here, the electronic apparatus 100 may provide the single-node Ethernet frame 1410 based on the control code area where the control code "1000_0001" is stored, the content area where the content "#01" is stored, the first data area where the first control command "brightness 20%" is stored, the second data area where the second control command "brightness 20%" is stored, and the feedback code area where the feedback code "0000" is stored.

Here, the electronic apparatus 100 may transmit the provided single-node Ethernet frame 1410 to the first node device 200-1.

The first node device 200-1 may then receive the single-node Ethernet frame 1410. In addition, the first node device 200-1 may display the content "#01" based on the content area included in the single-node Ethernet frame 1410. In addition, the first node device 200-1 may perform an operation corresponding to the first control command "brightness 20%" included in the first data area. Here, the first node device 200-1 may update (or change) the feedback code based on the results of the content display operation and the operation corresponding to the first control command. In detail, the first node device 200-1 may update the feedback code "0000" included in the single-node Ethernet frame 1410, based on the predefined function.

Here, the predefined function may be a function that is increased by "four (4)" in case that the content is displayed, and increased by "one (1)" in case that the control command is executed. A description related to the predefined function is described with reference to FIG. 13, and a redundant description is omitted.

The first node device 200-1 may perform the content display operation and the operation corresponding to the first control command, and thus allow the feedback code "0000" of the single-node Ethernet frame 1410 to be increased by "five (5)" to be updated as the feedback code "0101." In addition, the first node device 200-1 may provide a first feedback frame 1420 based on the updated feedback code "0101." Here, the first feedback frame 1420 may be a frame updated from the single-node Ethernet frame 1410. In addition, the first node device 200-1 may transmit the first feedback frame 1420 to the second node device 200-2.

The second node device 200-2 may then receive the first feedback frame 1420. In addition, the second node device 200-2 may display the content "#01" based on the content area included in the first feedback frame 1420. In addition, the second node device 200-2 may perform an operation corresponding to the second control command "brightness 20%" included in the second data area. Here, the second node device 200-2 may update (or change) the feedback code based on the results of the content display operation and the operation corresponding to the second control command. In detail, the second node device 200-2 may update the feedback code "0101" included in the first feedback frame 1420, based on the predefined function.

The second node device 200-2 may perform the content display operation and the operation corresponding to the second control command, and thus allow the feedback code "0101" of the first feedback frame 1420 to be increased by "five (5)" to be updated as the feedback code "1010." The second node device 200-2 may provide a second feedback frame 1430 based on the updated feedback code "1010."

Here, the second feedback frame 1430 may be a frame updated from the first feedback frame 1420. In addition, the second node device 200-2 may transmit the second feedback frame 1430 to the electronic apparatus 100. Here, the second node device 200-2 may transmit the second feedback frame 1430 to the electronic apparatus 100 in the reverse direction (or reverse path). For example, the second node device 200-2 may transmit the second feedback frame 1430 to the first node device 200-1, and the first node device 200-1 may retransmit the second feedback frame 1430 to the electronic apparatus 100. As a result, the second node device 200-2 may transmit the second feedback frame 1430 to the electronic apparatus 100.

Here, the electronic apparatus 100 may identify the integrities of the results of the operations performed by the first node device 200-1 and the second node device 200-2 based on the second feedback frame 1430 received from the second node device 200-2.

FIG. 15 is a view for explaining an operation of updating the Ethernet frame based on the operation of controlling one target node device through the multi-node Ethernet frame structure according to an example embodiment.

Referring to FIG. 15, the electronic apparatus 100 may control the second node device 200-2 by using the multi-node Ethernet frame 720. For example, assume the example 320 of FIG. 3. The electronic apparatus 100 may transmit the control command to control the second node device 200-2.

Here, a multi-node Ethernet frame 1510 may include the custom field, the data field and the CRC field. Here, the custom field may include the target node address area and the control code area. Here, the data field may include the content area, the first node area and the second node area. Here, the CRC field may include the feedback code area.

Here, the electronic apparatus 100 may provide the multi-node Ethernet frame 1510 based on the target node address area where the target node address "200-2" is stored, the control code area where the control code "0000_0001" is stored, the content area where the content "#01" is stored, the second node area where the control command "brightness 20%" is stored, and the feedback code area where the feedback code "0000" is stored.

Here, the electronic apparatus 100 may transmit the provided multi-node Ethernet frame 1510 to the first node device 200-1.

The first node device 200-1 may then receive the multi-node Ethernet frame 1510. In addition, the first node device 200-1 may display the content "#01" based on the content area included in the multi-node Ethernet frame 1510. Here, the first node device 200-1 may not perform an additional operation other than the content display operation because the target node address "200-2" does not match its own address. Here, the first node device 200-1 may update (or change) the feedback code based on the result of the content display operation. In detail, the first node device 200-1 may update the feedback code "0000" included in the multi-node Ethernet frame 1510, based on the predefined function.

Here, the predefined function may be the function that is increased by "four (4)" in case that the content is displayed, and increased by "one (1)" in case that the control command is executed.

The first node device 200-1 may perform the content display operation, and thus allow the feedback code "0000" of the multi-node Ethernet frame 1510 to be increased by "four (4)" to be updated as the feedback code "0100." In addition, the first node device 200-1 may provide a first feedback frame 1520 based on the updated feedback code "0100." Here, the first feedback frame 1520 may be a frame updated from the multi-node Ethernet frame 1510. In addition, the first node device 200-1 may transmit the first feedback frame 1520 to the second node device 200-2.

The second node device 200-2 may then receive the first feedback frame 1520. In addition, the second node device 200-2 may display the content "#01" based on the content area included in the first feedback frame 1520. In addition, the second node device 200-2 may perform an additional operation corresponding to the control command in addition to the content display operation because the target node address "200-2" matches its own address. In detail, the second node device 200-2 may execute the control command "brightness 20%" stored in the second node area. Here, the second node device 200-2 may update (or change) the feedback code based on the results of the content display operation and the operation corresponding to the control command. In detail, the second node device 200-2 may update the feedback code "0100" included in the first feedback frame 1520, based on the predefined function.

The second node device 200-2 may perform the content display operation and the operation corresponding to the control command, and thus allow the feedback code "0100" of the first feedback frame 1520 to be increased by "five (5)" to be updated as the feedback code "1001." The second node device 200-2 may provide a second feedback frame 1530 based on the updated feedback code "1001." Here, the second feedback frame 1530 may be a frame updated from the first feedback frame 1520. In addition, the second node device 200-2 may transmit the second feedback frame 1530 to the electronic apparatus 100. Here, the second node device 200-2 may transmit the second feedback frame 1530 to the electronic apparatus 100 in the reverse direction (or reverse path). For example, the second node device 200-2 may transmit the second feedback frame 1530 to the first node device 200-1, the first node device 200-1 may retransmit the second feedback frame 1530 to the electronic apparatus 100. As a result, the second node device 200-2 may transmit the second feedback frame 1530 to the electronic apparatus 100.

Here, the electronic apparatus 100 may identify the integrities of the results of the operations performed by the first node device 200-1 and the second node device 200-2 based on the second feedback frame 1530 received from the second node device 200-2.

FIG. 16 is a view for explaining an operation of updating the Ethernet frame based on the operation of controlling the plurality of target node devices through the multi-node Ethernet frame structure according to an example embodiment.

Referring to FIG. 16, the electronic apparatus 100 may control the first node device 200-1 and the second node device 200-2 by using the multi-node Ethernet frame 720. For example, assume the example 330 of FIG. 3. The electronic apparatus 100 may transmit the first control command to control the first node device 200-1 and the second control command to control the second node device 200-2.

Here, a multi-node Ethernet frame 1610 may include the custom field, the data field and the CRC field. Here, the custom field may include the target node address area and the control code area. Here, the data field may include the content area, the first node area and the second node area. Here, the CRC field may include the feedback code area.

Here, the electronic apparatus 100 may provide the multi-node Ethernet frame 1610 based on the control code area where the control code "1000_0001" is stored, the content area where the content "#01" is stored, the first node area where the first control command "brightness 20%" is stored, the second node area where the second control command "brightness 20%" is stored, and the feedback code area where the feedback code "0000" is stored.

Here, the electronic apparatus 100 may transmit the provided multi-node Ethernet frame 1610 to the first node device 200-1.

The first node device 200-1 may then receive the multi-node Ethernet frame 1610. In addition, the first node device 200-1 may display the content "#01" based on the content area included in the multi-node Ethernet frame 1610. In addition, the first node device 200-1 may perform an operation corresponding to the first control command "brightness 20%" included in the first node area. Here, the first node device 200-1 may update (or change) the feedback code based on the results of the content display operation and the operation corresponding to the first control command. In detail, the first node device 200-1 may update the feedback code "0000" included in the multi-node Ethernet frame 1610, based on the predefined function.

Here, the predefined function may be a function that is increased by "four (4)" in case that the content is displayed, and increased by "one (1)" in case that the control command is executed. The description related to the predefined function is described with reference to FIG. 13, and the redundant description is omitted.

The first node device 200-1 may perform the content display operation and the operation corresponding to the first control command, and thus allow the feedback code "0000" of the multi-node Ethernet frame 1610 to be increased by "five (5)" to be updated as the feedback code "0101." In addition, the first node device 200-1 may provide a first feedback frame 1620 based on the updated feedback code "0101." Here, the first feedback frame 1620 may be a frame updated from the multi-node Ethernet frame 1610. In addition, the first node device 200-1 may transmit the first feedback frame 1620 to the second node device 200-2.

The second node device 200-2 may then receive the first feedback frame 1620. In addition, the second node device 200-2 may display the content "#01" based on the content area included in the first feedback frame 1620. In addition, the second node device 200-2 may perform an operation corresponding to the second control command "brightness 20%" included in the second node area. Here, the second node device 200-2 may update (or change) the feedback code based on the results of the content display operation and the operation corresponding to the second control command. In detail, the second node device 200-2 may update the feedback code "0101" included in the first feedback frame 1620, based on the predefined function.

The second node device 200-2 may perform the content display operation and the operation corresponding to the second control command, and thus allow the feedback code "0101" of the first feedback frame 1620 to be increased by "five (5)" to be updated as the feedback code "1010." The second node device 200-2 may provide a second feedback frame 1630 based on the updated feedback code "1010." Here, the second feedback frame 1630 may be a frame updated from the first feedback frame 1620. In addition, the second node device 200-2 may transmit the second feedback frame 1630 to the electronic apparatus 100. Here, the second node device 200-2 may transmit the second feedback frame 1630 to the electronic apparatus 100 in the reverse direction (or reverse path). For example, the second node device 200-2 may transmit the second feedback frame 1630 to the first node device 200-1, and the first node device 200-1 may retransmit the second feedback frame 1630 to the electronic apparatus 100. As a result, the second node device 200-2 may transmit the second feedback frame 1630 to the electronic apparatus 100.

Here, the electronic apparatus 100 may identify the integrities of the results of the operations performed by the first node device 200-1 and the second node device 200-2 based on the second feedback frame 1630 received from the second node device 200-2.

Figure 17:
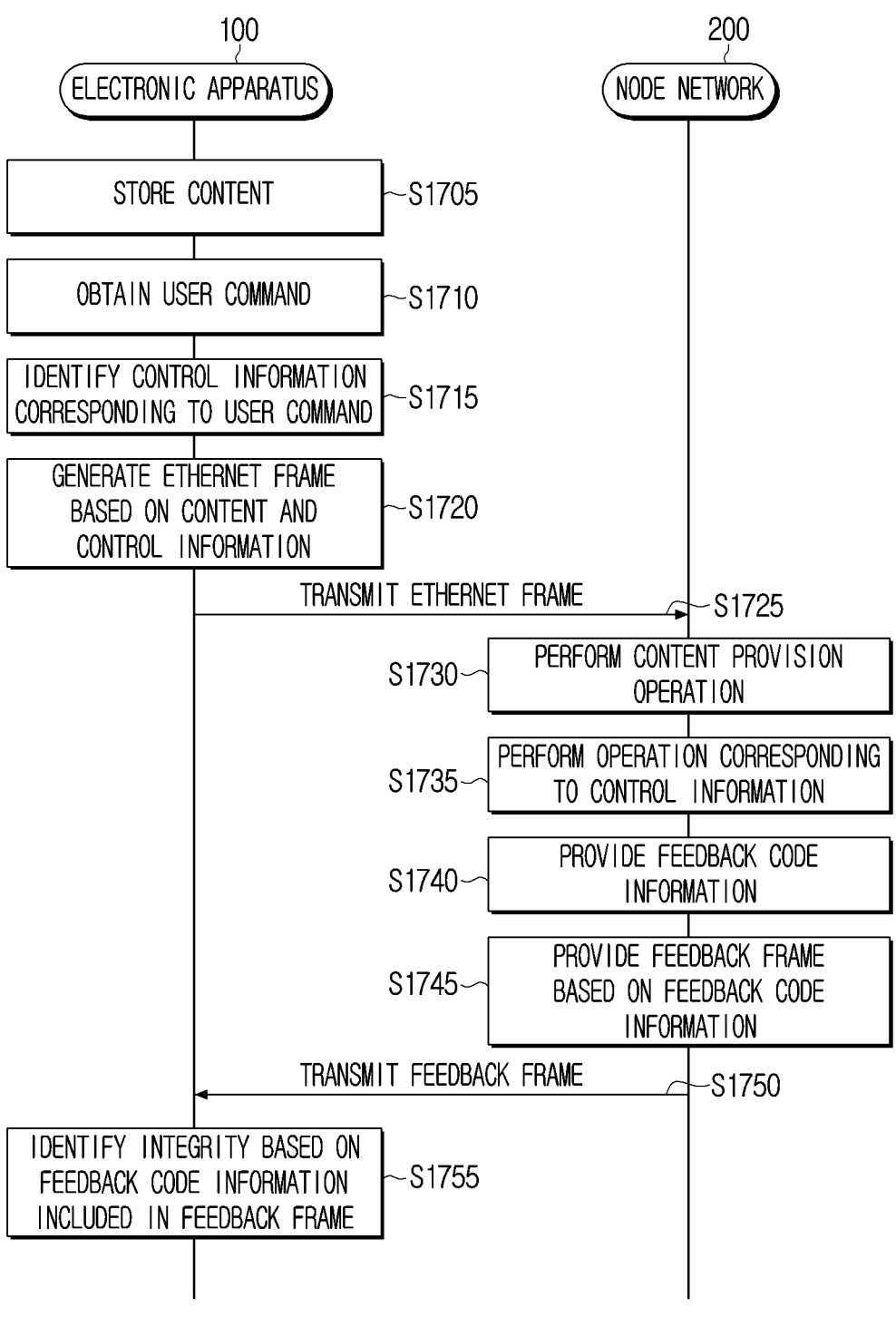
FIG. 17 is a flowchart for explaining a process in which the plurality of node devices perform operations corresponding to control information according to an example embodiment of the disclosure.

FIG. 17 is a flowchart for explaining a process in which the node network 200 performs an operation corresponding to control information according to an example embodiment.

Referring to FIG. 17, the electronic apparatus 100 may be connected to the plurality of node devices 200-1 to 200-*n* by the serial communication. In operation S1705, the electronic apparatus 100 may store the content. In operation S1710, the electronic apparatus 100 may obtain the user command. According to example embodiment, the electronic apparatus 100 may obtain the user command after the content is stored in the electronic apparatus 100. In operation S1715, the electronic apparatus 100 may identify the control information corresponding to the user command. In operation S1720, the electronic apparatus 100 may provide an Ethernet frame based on the content and the control information. In operation S1725, the electronic apparatus 100 may transmit the Ethernet frame provided in the operation S1720 to the node network 200.

Here, the node network 200 may receive the Ethernet frame from the electronic apparatus 100. In operation S1730, the node network 200 may perform the content provision operation based on the content included in the Ethernet frame. In operation S1735, the node network 200 may perform an operation corresponding to the control information included in the Ethernet frame. In operation S1740, the node network 200 may provide the feedback code information based on an execution result of the operation. In operation S1745, the node network 200 may provide the feedback frame based on the feedback code information. Here, the feedback frame may be a frame updated from the Ethernet frame based on the feedback code information. In operation S1750, The node network 200 may transmit the feedback frame to the electronic apparatus 100.

Here, the electronic apparatus 100 may receive the feedback frame from the node network 200. In operation S1755, the electronic apparatus 100 may identify integrity based on the feedback code information included in the feedback frame. In detail, the electronic apparatus 100 may identify the integrity of the execution result of the operation corresponding to the control information based on the feedback code information. The operation to identify the integrity may be an operation to check that an error is not included in the operation performed by the node network 200.

Here, the node network 200 may refer to a plurality of device groups. Therefore, the node network 200 may refer to a node system. Here, the operation of transmitting the Ethernet frame to the node network 200 may refer to the operation of transmitting the Ethernet frame to one node device in the node network 200. In addition, the operation of transmitting the feedback frame to the electronic apparatus 100 by the node network 200 may refer to the operation of transmitting the feedback frame by one node device in the node network 200. Here, the node device performing the operation of receiving the Ethernet frame and the node device performing the operation of transmitting the feedback frame may be different from each other.

Figure 18:
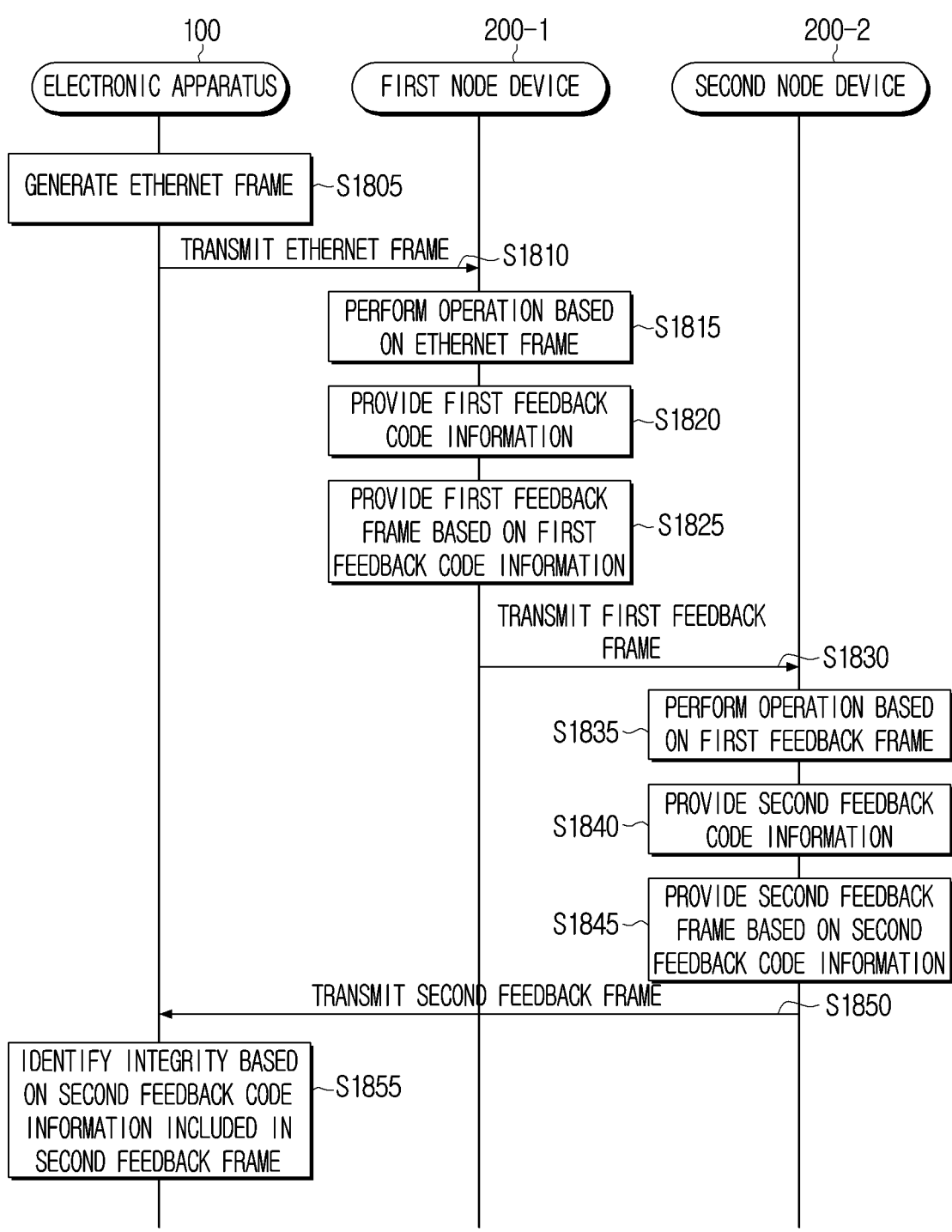
FIG. 18 is a flowchart for explaining a process in which the target node device among the plurality of node devices performs an operation corresponding to the control information according to an example embodiment of the disclosure.

FIG. 18 is a flowchart for explaining a process in which the target node device among the plurality of node devices

200-1 to 200-*n* performs the operation corresponding to the control information according to an example embodiment.

Referring to FIG. 18, the electronic apparatus 100 may be connected in series with the first node device 200-1 and the second node device 200-2. In operation S1805, the electronic apparatus 100 may generate the Ethernet frame. In operation S1810, the electronic apparatus 100 may transmit the Ethernet frame to the first node device 200-1.

Here, the first node device 200-1 may receive the Ethernet frame from the electronic apparatus 100. In operation S1815, the first node device 200-1 may perform an operation based on the Ethernet frame. In operation S1820, the first node device 200-1 may provide first feedback code information based on an execution result of the operation. In operation S1825, the first node device 200-1 may provide the first feedback frame based on the first feedback code information. Here, the first feedback frame may refer to a frame updated from the Ethernet frame based on the first feedback code information. In operation S1830, the first node device 200-1 may transmit the first feedback frame to the second node device 200-2.

Here, the second node device 200-2 may receive the first feedback frame from the first node device 200-1. In operation S1835, the second node device 200-2 may perform an operation based on the first feedback frame. In operation S1840, the second node device 200-2 may provide the second feedback code information based on an execution result of the operation. In operation S1845, the second node device 200-2 may provide the second feedback frame based on the second feedback code information. Here, the second feedback frame may refer to a frame updated from the first feedback frame based on the second feedback code information. In operation S1850, the second node device 200-2 may transmit the second feedback frame to the electronic apparatus 100.

Here, the electronic apparatus 100 may receive the second feedback frame from the second node device 200-2. The electronic apparatus 100 may then identify integrity based on the second feedback code information included in the second feedback frame. In detail, in operation S1855, the electronic apparatus 100 may identify the integrity of the execution result of the operation corresponding to the control information based on the second feedback code information. The operation to identify the integrity may be an operation to check that an error is not included in the operation performed by the first node device 200-1 or the second node device 200-2.

Figure 19:
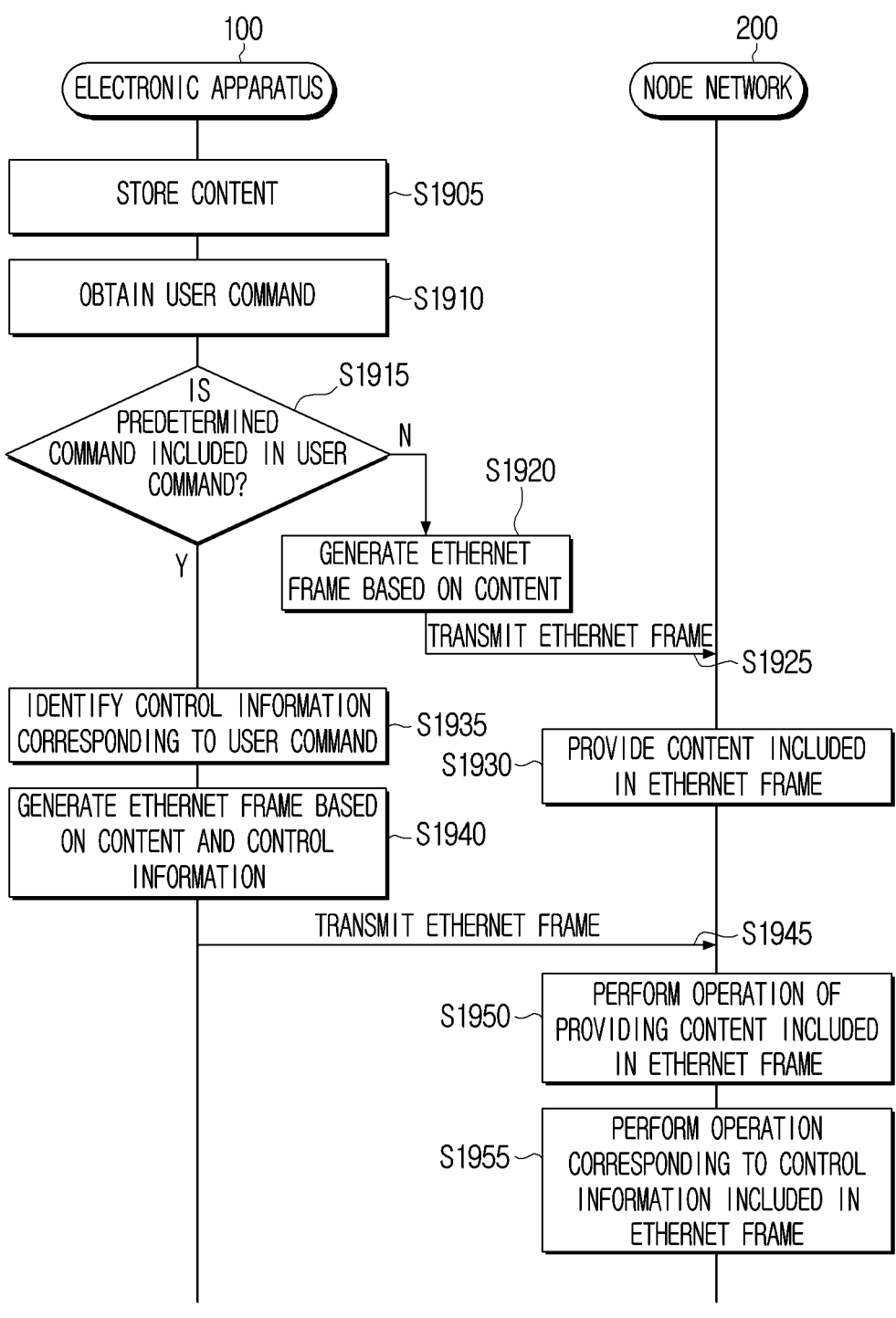
FIG. 19 is a flowchart for explaining an operation of providing an Ethernet frame based on a predetermined command according to an example embodiment of the disclosure.

FIG. 19 is a flowchart for explaining an operation of providing the Ethernet frame based on the predetermined command according to another example embodiment.

Referring to FIG. 19, the electronic apparatus 100 may be connected to the plurality of node devices 200-1 to 200-*n* through the serial communication. Here, in operation S1905, the electronic apparatus 100 may store the content. In operation S1910, the electronic apparatus 100 may obtain the user command. In operation S1915, the electronic apparatus 100 may determine whether the predetermined command is included in the user command.

Here, the predetermined command may refer to a command to control the plurality of node devices 200-1 to 200-*n* in addition to the default command. The predetermined command may refer to a control command included in the user command in addition to the default command provided repeatedly. Here, the default command may be a command that is repeatedly transmitted to the plurality of node devices 200-1 to 200-*n*. For example, the default command may be a command to output (or stop the output of) the content.

Here, the predetermined command may be a command related to setting output of the display of the node device. For example, the command related to setting the output of the display device may include at least one of brightness, contrast, color or resolution. Meanwhile, the predetermined command may not include the default command.

In case that the user command does not include the predetermined command (S1915-N), the electronic apparatus 100 may provide the Ethernet frame based on the content (S1920). Here, the electronic apparatus 100 may generate the Ethernet frame based on the content. In operation S1925, the electronic apparatus 100 may transmit the Ethernet frame provided in the operation S1920 to the node network 200. Here, the meaning that the predetermined command is not included may refer to the fact that only the default command is included in the user command. Here, the Ethernet frame provided in the operation S1920 may refer to a frame only including a content provision command (or a content provision stop command) rather than the predetermined command.

Here, the node network 200 may receive the Ethernet frame (provided in the operation S1920) from the electronic apparatus 100. In operation S1930, the node network 200 may provide the content included in the Ethernet frame. In addition, the node network 200 may repeatedly receive the Ethernet frame from the electronic apparatus 100.

Meanwhile, in case that the predetermined command is included in the user command (S1915-Y), the electronic apparatus 100 may identify the control information corresponding to the user command (S1935). In operation S1940, the electronic apparatus 100 may provide the Ethernet frame based on the content and the control information. In operation 51945, the electronic apparatus 100 may transmit the Ethernet frame provided in operation S1940 to the node network 200.

Here, the node network 200 may receive the Ethernet frame (provided in the operation S1940) from the electronic apparatus 100. In operation S1950, the node network 200 may provide the content included in the Ethernet frame. In operation S1955, the node network 200 may perform an operation corresponding to the control information included in the Ethernet frame.

Meanwhile, the node network 200 may provide the feedback code information based on the result of the operation performed by each individual node device. In addition, the node network 200 may provide the feedback frame based on the feedback code information. One node device may transmit the feedback frame to a next node device connected in series. In addition, the last connected node device may transmit the feedback frame to the electronic apparatus 100.

Figure 20:
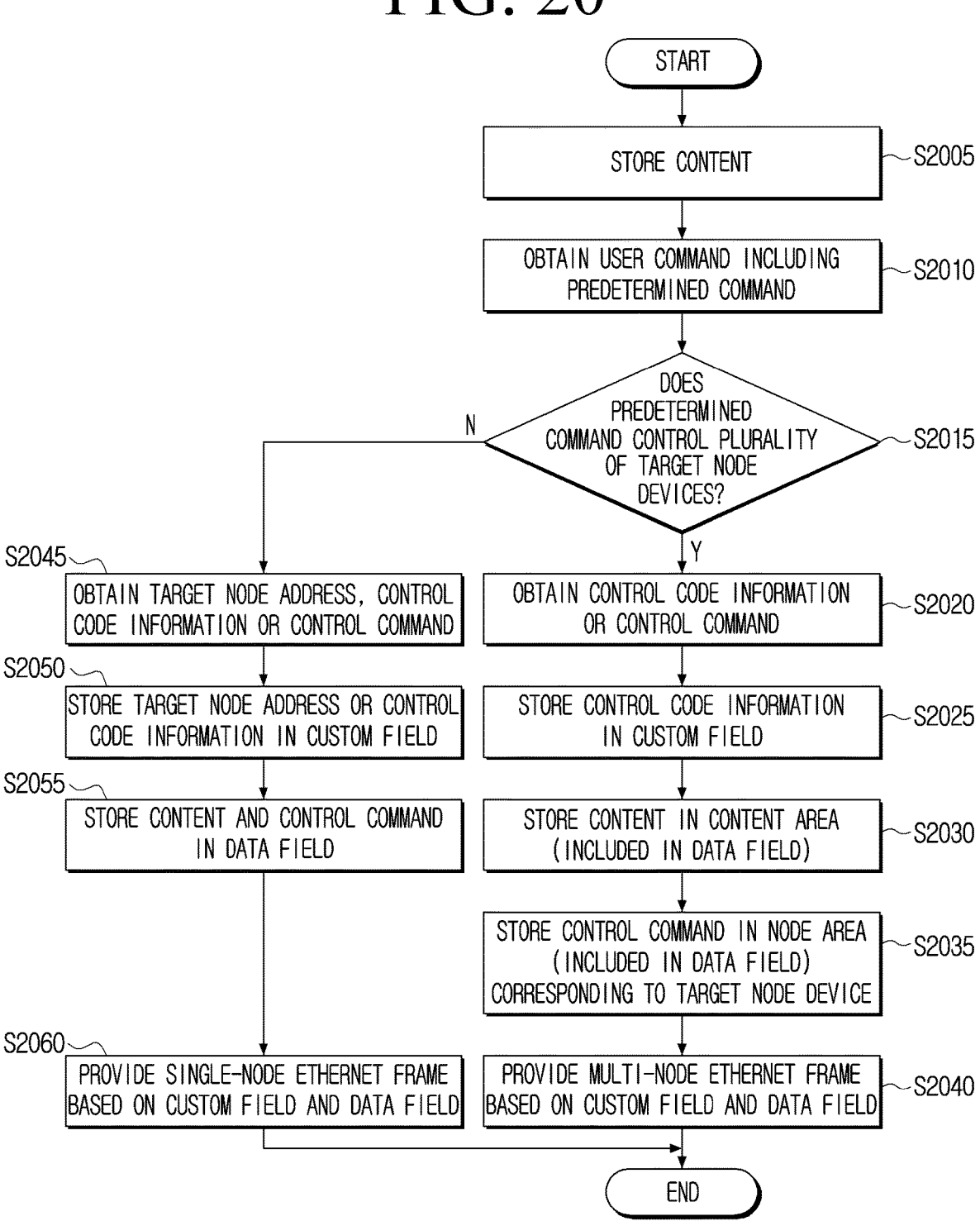
FIG. 20 is a flowchart for explaining the operation of providing the Ethernet frame based on the number of target nodes according to an example embodiment of the disclosure.

FIG. 20 is a flowchart for explaining the operation of providing the Ethernet frame based on the number of target nodes according to an example embodiment of the disclosure.

Referring to FIG. 20, in operation 52005, the electronic apparatus 100 may store the content. In operation 52010, the electronic apparatus 100 may obtain the user command including the predetermined command. In operation S2015, the electronic apparatus 100 may determine whether the predetermined command is a command to control the plurality of target node devices.

In case that the predetermined command is the command to control the plurality of target node devices (S2015-Y), the electronic apparatus 100 may obtain the control code information or the control command based on the predetermined command (S2020). In operation S2025, the electronic apparatus 100 may store the control code information in the custom field. In operation S2030, the electronic apparatus 100 may store the content in the content area (included in the data field). In operation S2035, the electronic apparatus 100 may store the control command in the node area (included in the data field) corresponding to the target node device. Here, the data field may include the plurality of node areas, and the plurality of node areas may be areas each corresponding to the plurality of node devices 200-1 to 200-n. For example, the first node area may be an area corresponding to the first node device 200-1, and the second node area may be an area corresponding to the second node device 200-2. The electronic apparatus 100 may identify the plurality of target node devices and store the control commands to be transmitted to the plurality of target node devices in the areas each corresponding to the plurality of target node devices. In addition, in operation S2040, the electronic apparatus 100 may provide the multi-node Ethernet frame based on the custom field and the data field.

For example, it may be assumed that the predetermined command includes the first control command to control the first node device 200-1 and the second control command to control the second node device 200-2. Here, the target node devices may be the first node device 200-1 and the second node device 200-2. The electronic apparatus 100 may store the first control command in the first node area corresponding to the first node device 200-1, and store the second control command in the second node area corresponding to the second node device 200-2. In addition, the electronic apparatus 100 may provide the Ethernet frame for controlling the multi-node devices based on the data field including the first control command and the second control command.

Meanwhile, in case that the predetermined command is not the command to control the plurality of target node devices (S2015-N), the electronic apparatus 100 may determine that the predetermined command is a command to control the single target node device. In operation S2045, the electronic apparatus 100 may obtain the target node address (i.e., address of the target node device), the control code information or the control command. In operation S2050, the electronic apparatus 100 may store at least one of the target node address or the control code information in the custom field. In operation S2055, the electronic apparatus 100 may store the content and the control command in the data field. In operation S2060, the electronic apparatus 100 may provide the single-node Ethernet frame based on the custom field and the data field.

Meanwhile, the single-node Ethernet frame structure is described in the example 701 of FIG. 7. The description related to the operation of controlling one target node device by using the single-node Ethernet frame is described with reference to FIGS. 9 and 13. The multi-node Ethernet frame structure is described in the example 702 of FIG. 7. The description related to the operation of controlling the plurality of target node devices by using the multi-node Ethernet frame is described with reference to FIGS. 12 and 16.

Figure 21:
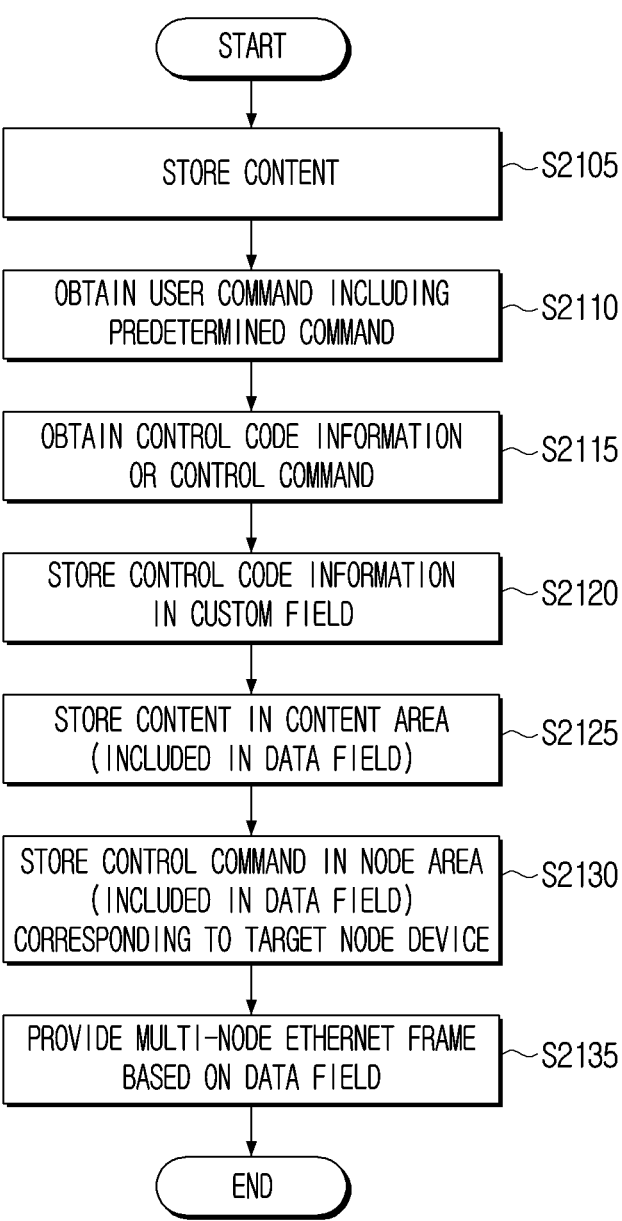
FIG. 21 is a flowchart for explaining the operation of providing the Ethernet frame by using the same structure regardless of the number of target nodes according to an example embodiment of the disclosure.

FIG. 21 is a flowchart for explaining the operation of providing the Ethernet frame by using the same structure regardless of the number of target nodes according to an example embodiment of the disclosure.

Referring to FIG. 21, the electronic apparatus 100 may control the target node device by using the multi-node Ethernet frame regardless of the number of target node devices.

The description describes an example in which the single-node Ethernet frame is provided to control one target node device and the multi-node Ethernet frame is provided to control the plurality of target node devices with reference to FIG. 20. However, it is possible to control at least one target node device by using the multi-node Ethernet frame rather than the single-node Ethernet frame.

According to an example embodiment, in operation S2105, the electronic apparatus 100 may store the content. In operation S2110, the electronic apparatus 100 may obtain the user command including the predetermined command (S2110). In operation S2115, the electronic apparatus 100 may obtain the control code information or the control command. In operation S2120, the electronic apparatus 100 may store the control code information in the custom field. In operation S2125, the electronic apparatus 100 may store the content in the content area (included in the data field). In operation S2130, the electronic apparatus 100 may store the control command in the node area (included in the data field) corresponding to the target node device. In operation S2135, the electronic apparatus 100 may provide the multi-node Ethernet frame based on the data field.

Meanwhile, the multi-node Ethernet frame structure is described in the example 702 of FIG. 7. The description related to the operation of controlling one target node device by using the multi-node Ethernet frame is described with reference to FIGS. 11 and 15. The description related to the operation of controlling the plurality of target node devices by using the multi-node Ethernet frame is described with reference to FIGS. 12 and 16.

Figure 22:
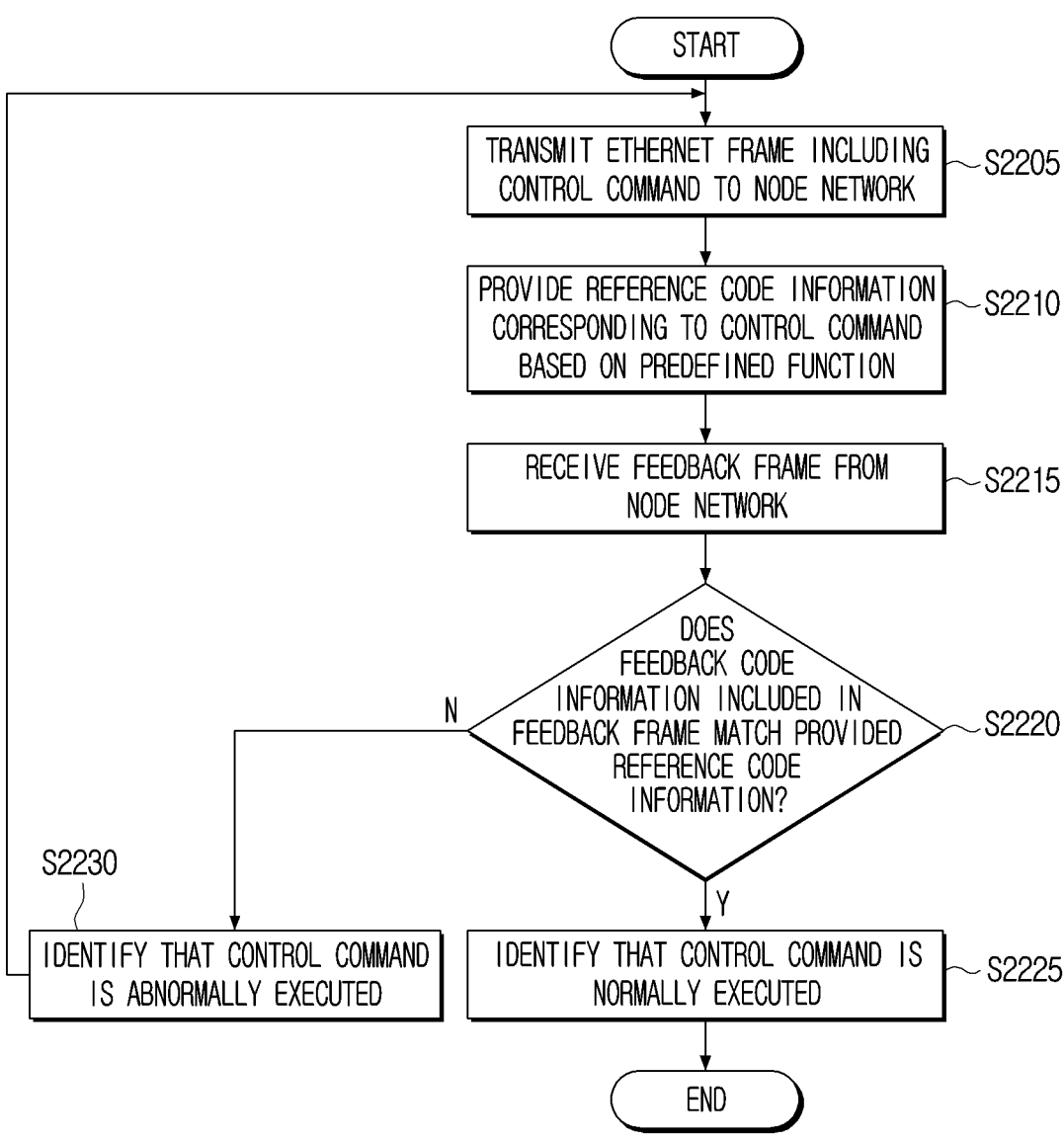
FIG. 22 is a flowchart for explaining an operation of checking integrity of an execution result of a control command based on a feedback frame according to an example embodiment of the disclosure.

FIG. 22 is a flowchart for explaining an operation of checking the integrity of the execution result of the control command based on the feedback frame according to an example embodiment of the disclosure.

Referring to FIG. 22, in operation S2205, the electronic apparatus 100 may transmit the Ethernet frame including the control command to the node network 200. In operation S2210, the electronic apparatus 100 may provide the reference code information corresponding to the control command based on the predefined function. In operation S2215, the electronic apparatus 100 may receive the feedback frame from the node network 200. In addition, the electronic apparatus 100 may obtain the feedback code information included in the feedback frame. In operation S2220, the electronic apparatus 100 may determine whether the feedback code information included in the feedback frame matches the reference code information provided in the operation S2210.

In case that the feedback code information matches the reference code information (S2220-Y), the electronic apparatus 100 may identify that the control command is normally executed by the node network 200 (S2225). Meanwhile, in case that the feedback code information does not match the reference code information (S2220-N), the electronic apparatus 100 may identify that the control command is abnormally executed by the node network 200 (S2230). In addition, the electronic apparatus 100 may perform the predetermined operation in case that the control command is abnormally executed. For example, the electronic apparatus 100 may provide a notification to the user or repeatedly retransmit the control command.

Figure 23:
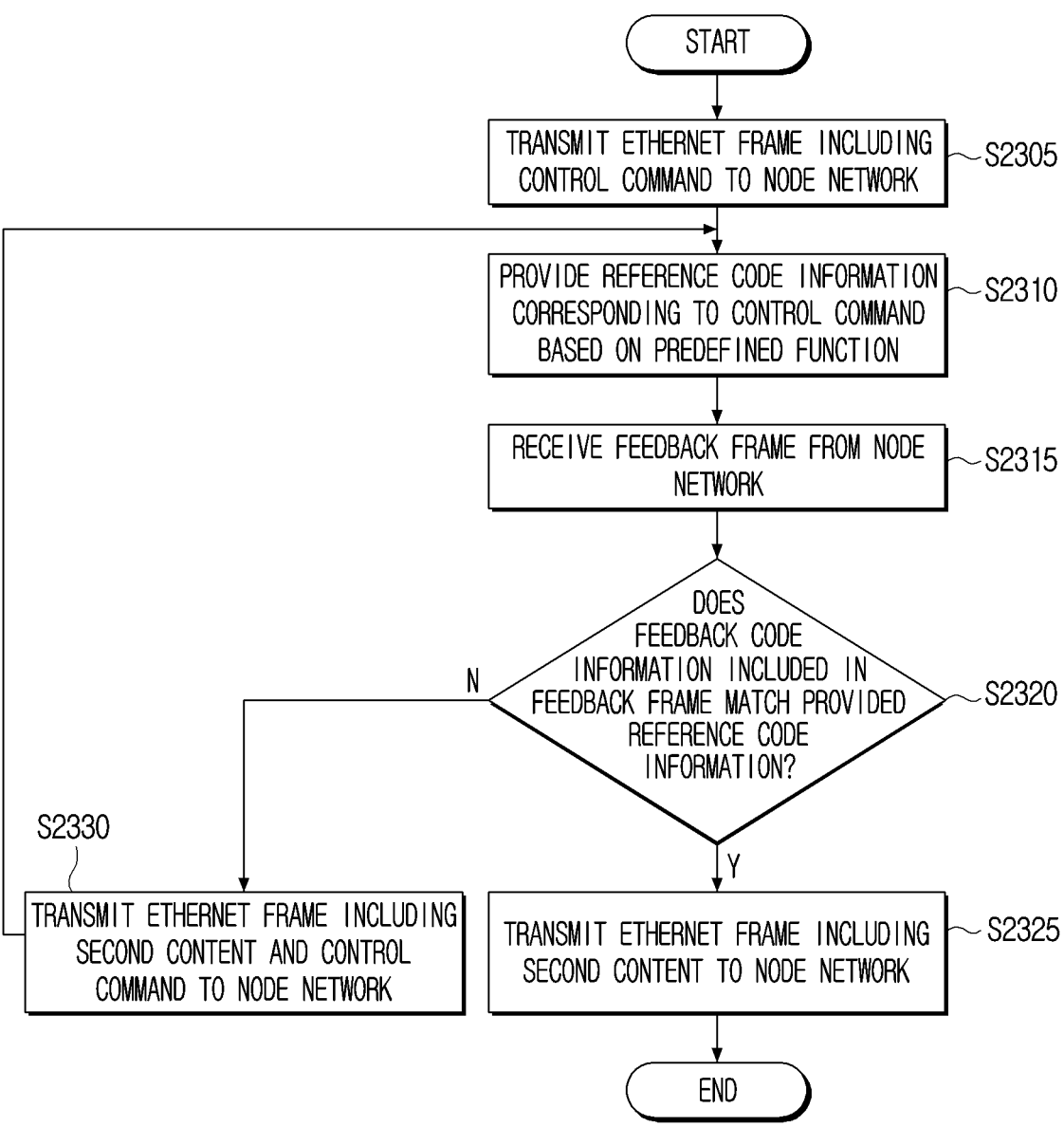
FIG. 23 is a view for explaining an operation of the electronic apparatus, performed based on a result of identifying the integrity according to an example embodiment of the disclosure.

FIG. 23 is a view for explaining an operation of the electronic apparatus 100, performed based on a result of identifying the integrity.

Referring to FIG. 23, operations S2305, S2310, S2315 and S2320 correspond to the operations S2205, S2210, S2215 and S2220 of FIG. 22, and a redundant description is thus omitted.

In case that the feedback code information matches the reference code information (S2320-Y), the electronic apparatus 100 may identify that the control command is normally executed by the node network 200. In operation S2325, the electronic apparatus 100 may transmit the Ethernet frame including the second content to the node network 200. The control command may not be included in the Ethernet frame transmitted in the operation S2325. The reason is that it is already determined that the control command is normally executed by the node network 200.

Meanwhile, in case that the feedback code information does not match the reference code information (S2320-N), the electronic apparatus 100 may identify that the control command is abnormally executed by the node network 200. Here, in operation S2330, the electronic apparatus 100 transmit the Ethernet frame including the second content provided after the first content and the control command to the node network 200. Here, the second content may refer to content provided to the node network 200 after the first content. The electronic apparatus 100 may perform the operations S2310, S2315 and S2320 by retransmitting the control command to the node network 200. As a result, the electronic apparatus 100 may repeatedly transmit the control command to the node network 200 in case that the integrity is not checked.

The description referring to FIG. 23 describes that the second content is provided after the first content to explain the time sequence. However, the first content may be repeatedly provided again after the first content depending on the implemented example.

Figure 24:
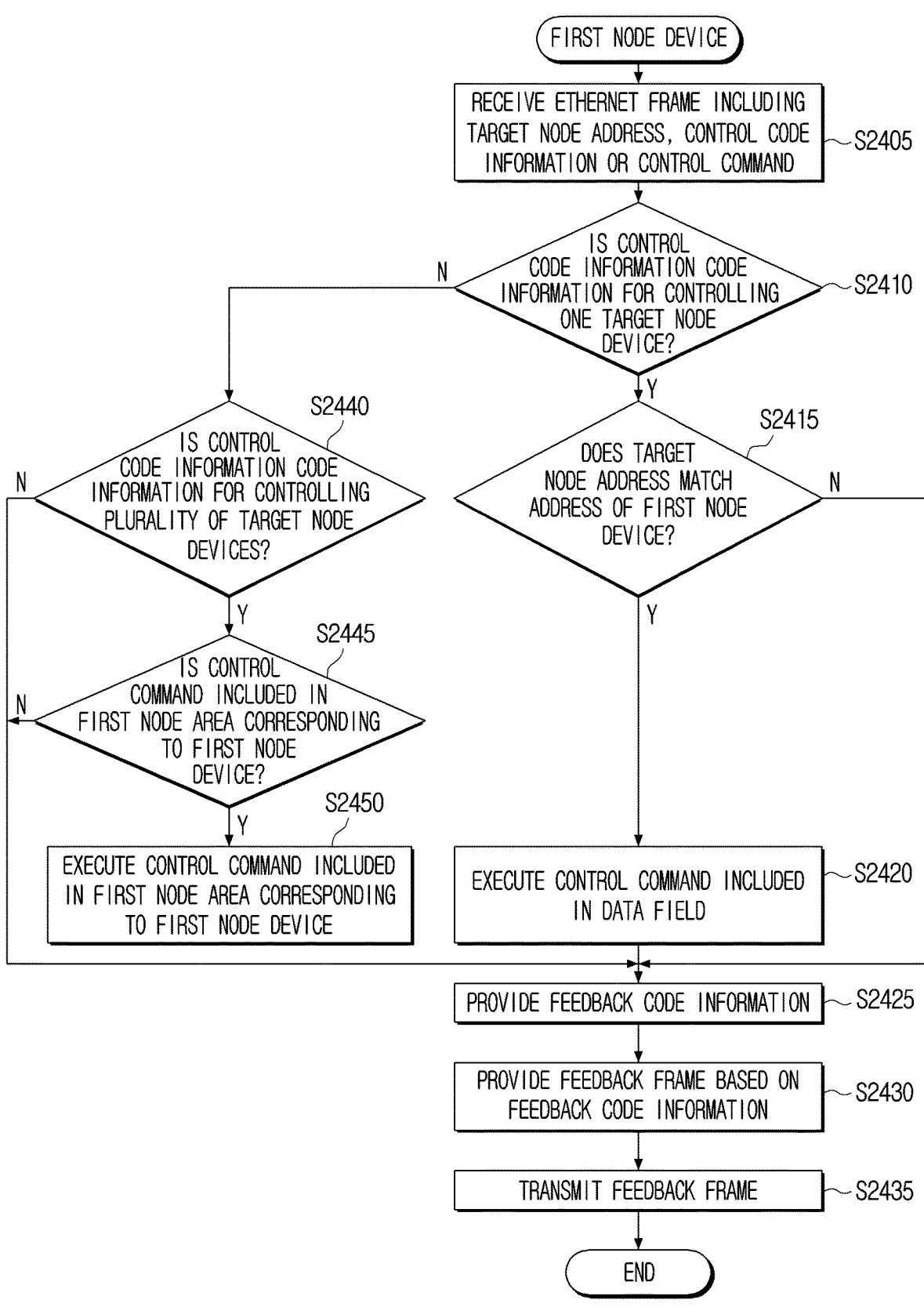
FIG. 24 is a flowchart for explaining a method of controlling a first node device according to an example embodiment of the disclosure.

FIG. 24 is a flowchart for explaining a method of controlling the first node device 200-1 according to an example embodiment of the disclosure.

Referring to FIG. 24, in operation S2405, the first node device 200-1 may receive the Ethernet frame including at least one of the target node address, the control code information or the control command (S2405). In operation S2410, the first node device 200-1 may determine whether the control code information is the code information for controlling one target node device (S2410).

In case that the control code information is the code information for controlling one target node device (S2410-Y), the first node device 200-1 may determine whether the target node address included in the Ethernet frame matches an address of the first node device 200-1 (S2415). In case that the target node address included in the Ethernet frame and the address of the first node device 200-1 do not match each other (S2415-N), the first node device 200-1 may directly provide the feedback code information without performing a separate control operation (S2425). Meanwhile, in case that the target node address included in the Ethernet frame matches the address of the first node device 200-1 (S2415-Y), the first node device 200-1 may execute the control command included in the data field (S2420). In operation S2425, the first node device 200-1 may provide the feedback code information based on a result of the operation to execute the control command.

Meanwhile, in case that the control code information is not the code information for controlling one target node device (S2410-N), the first node device 200-1 may determine whether the control code information is the code information for controlling the plurality of target node devices (S2440). Here, in case that the control code information is not the code information for controlling the plurality of target node devices (S2440-N), the first node device 200-1 may immediately provide the feedback code information (S2425). In case that the control code information is the code information for controlling the plurality of target node devices (S2440-Y), the first node device 200-1 may determine whether the control command is included in the first node area corresponding to the first node device 200-1 (S2445). Here, in case that the control command is not included in the first node area (S2445-N), the first node device 200-1 may immediately provide the feedback code information (S2425). In case that the control command is included in the first node area (S2445-Y), the first node device 200-1 may perform the control operation based on the control command included in the first node area corresponding to the first node device 200-1 (S2450). In addition, in operation S2425, the first node device 200-1 may provide the feedback code information based on a result of the control operation.

In operation S2430, the first node device 200-1 may provide the feedback frame based on the feedback code information after providing the feedback code information. In operation S2435, the first node device (200-1) may transmit the feedback frame to another node device (e.g., second node device 200-2) included in the node network 200.

Figure 25:
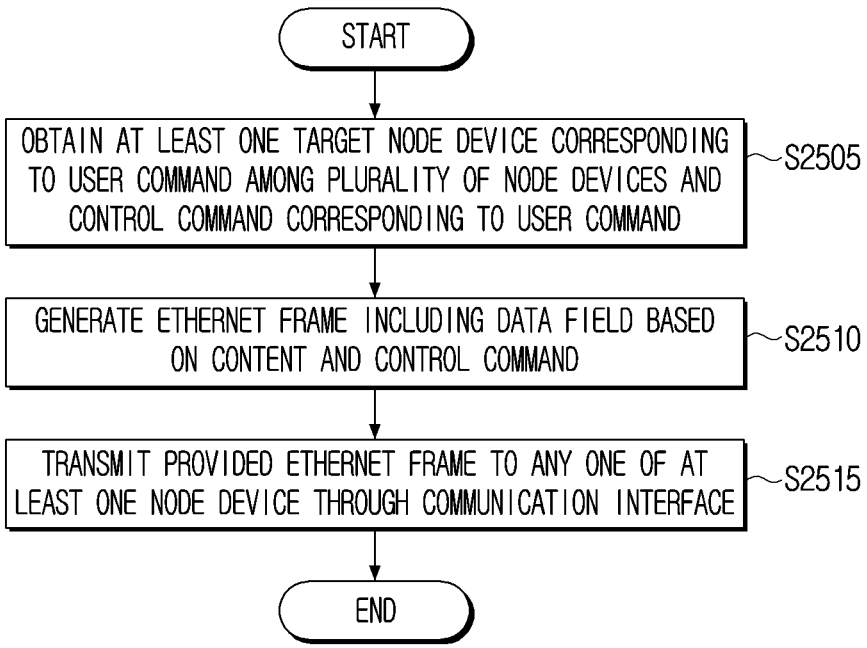
FIG. 25 is a flowchart for explaining a controlling method of an electronic apparatus according to another example embodiment of the disclosure.

FIG. 25 is a flowchart for explaining a controlling method of the electronic apparatus 100 according to another example embodiment of the disclosure.

Referring to FIG. 25, the controlling method of an electronic apparatus 100 storing content and communicating with at least one node device among the plurality of node devices 200-1 to 200-n connected by serial communication may include operations S2505, S2510 and S2515. For instance, operation S2505, S2510 and S2515 may include obtaining at least one target node device corresponding to a user command among the plurality of node devices 200-1 to 200-n and a control command corresponding to the user command (S2505), providing an Ethernet frame including a data field based on the content and the control command (S2510), and transmitting the provided Ethernet frame to any one of the at least one node device (S2515). Here, the data field included in the Ethernet frame includes a content area where information on the content is stored and a plurality of node areas each corresponding to the plurality of node devices 200-1 to 200-n, and the control command is stored in an node area corresponding to the at least one target node device among the plurality of node areas.

Meanwhile, the Ethernet frame may further include a custom field, and the controlling method may further include obtaining control code information on at least one of the number or transmission method of the at least one target node device based on the user command; and providing the Ethernet frame by including the obtained control code information in the custom field.

Meanwhile, the at least one node device may include a first node device 200-1 and a second node device 200-2, in the transmitting (S2515), the Ethernet frame including the control command may be transmitted to the first node device 200-1, and the controlling method may further include identifying integrity of an execution result of the control command made by the at least one target node device based on a feedback frame in case that the feedback frame is received from the second node device 200-2.

Meanwhile, the feedback frame may be a second feedback frame, and the second feedback frame may be provided by the second node device 200-2 based on a first feedback frame provided by the first node device 200-1. Here, the first feedback frame may be a feedback frame for an operation performed by the first node device 200-1 based on the Ethernet frame, and the second feedback frame may be a feedback frame for an operation performed by the second node device 200-2 that receives the first feedback frame from the first node device 200-1.

Meanwhile, in the identifying of the integrity, reference code information corresponding to the control command may be obtained, feedback code information included in the feedback frame may be obtained in case that the feedback frame is received, and the integrity of the execution result of the control command may be identified based on the obtained feedback code information and reference code information.

Meanwhile, the controlling method may further include retransmitting the Ethernet frame to the first node device 200-1 in case that the obtained feedback code information and reference code information do not match each other.

Meanwhile, the feedback code information may be the code information provided by each of the plurality of node devices 200-1 to 200-n by updating the feedback code information received from the adjacent node device through the serial communication.

Meanwhile, in the providing of the Ethernet frame (S2510), the Ethernet frame including the content and the control command corresponding to the predetermined command may be provided in case that the user command includes the predetermined command, and the Ethernet frame including the content may be provided in case that the user command does not include the predetermined command.

Meanwhile, in case that the user command is a command to control each of a first target node device and a second target node device, in the providing of the Ethernet frame (S2510), the first control command to control the first target node device may be stored in a first node area corresponding to the first target node device among the plurality of node areas included in the data field, the second control command to control the second target node device may be stored in the second node area corresponding to the second target node device among the plurality of node areas included in the data field, and the Ethernet frame may be provided based on the data field including the first control command and the second control command.

Meanwhile, the Ethernet frame may further include the custom field, and the user command may be a command to control one target node device among the plurality of node devices 200-1 to 200-n in the providing of the Ethernet frame (S2510). In this case, node address information corresponding to the target node device may be stored in the custom field, the control command to control the target node device may be stored in any area of the data field, and the Ethernet frame may be provided based on the custom field that includes the node address information and the data field that includes the control command.

Meanwhile, the controlling method of the electronic apparatus as shown in FIG. 25 may be performed by the electronic apparatus having the configuration of FIG. 2, and may also be performed by the electronic apparatus having another configuration.

Although the operations of the methods or processes illustrated in FIGS. 17 to 25 are shown an particular order or sequence, the disclosure is not limited thereto. As such, according to another example embodiment, the order or the sequence of the operations in the methods or processes illustrated in FIGS. 17 to 25 may be different.

Meanwhile, various examples of the method according to the disclosure described above may be implemented as applications which may be installed in an electronic apparatus.

In addition, the various examples of the method according to the disclosure described above may be implemented only by upgrading the software or hardware of the electronic apparatus.

In addition, it is also possible that the various examples of the method according to the disclosure described above are performed through an embedded server provided in the electronic apparatus, or an external server of at least one of the electronic apparatus and the display apparatus.

Meanwhile, according to another example embodiment of the disclosure, the various examples described above may be implemented as software including instructions stored in machine-readable storage media readable by a machine (e.g., computer). The machine is an apparatus capable of calling an instruction stored from the storage medium and operated based on the called instruction, and may include the electronic apparatus according to an example embodiment disclosed above. In case that the instruction is executed by a processor, the processor may perform a function corresponding to the instruction, either directly or by using another component under control of the processor. The instruction may include a code provided or executed by a compiler or an interpreter. The machine-readable storage medium may be provided in the form of a non-transitory storage medium. Here, 'non-transitory' indicates that the storage medium does not include a signal and is tangible, and does not distinguish that data is semi-permanently or temporarily stored in the storage medium.

In addition, according to another example embodiment of the disclosure, the various examples of the method described above may be included in a computer program product and then provided. The computer program product may be traded between a seller and a buyer as a commodity. The computer program product may be distributed in the form of a machine-readable storage medium (e.g., compact disc read only memory (CD-ROM)) or online via an application store (e.g., PlayStore™). In case of the online distribution, at least a portion of the computer program product may be temporarily stored, or temporarily provided, at least in a storage medium such as a memory of a server of a manufacturer, a server of an application store or a relay server.

In addition, each of the components (e.g., module or program) in the above-described various example embodiments may include a singular entity or a plurality of entities, and some of the above-described sub-components may be omitted, or another sub-component may be further included in the various example embodiments. Alternatively or additionally, some components (e.g., modules or programs) may be integrated into a single entity to perform the same or similar functions performed by each corresponding component prior to the integration. Operations performed by a module, program or another component according to the various example embodiments may be executed sequentially, in parallel, iteratively or heuristically, or at least some operations may be executed in a different sequence, may be omitted or another operation may be added thereto.

Although the embodiments of the disclosure are shown and described as above, the disclosure is not limited to the above mentioned specific embodiments, and may be variously modified by those skilled in the art to which the disclosure pertains without departing from the gist of the disclosure as disclosed in the accompanying claims. These modifications should also be understood to fall within the scope and spirit of the disclosure.

What is claimed:

1. An electronic apparatus comprising:
a memory configured to store content, the content comprising media content;
a communication interface configured to serially communicate with one or more node devices, among a plurality of node devices connected in a serial communication; and
one or more processor configured to:
determine at least one target node device corresponding to a user command, among the plurality of node devices, and a control command corresponding to the user command, the control command configured to control an operation of the at least one target node device,
generate an Ethernet frame based on the content and the control command, the Ethernet frame comprising a data field, and
transmit the Ethernet frame to any one of the one or more node devices through the communication interface,
wherein the data field comprises a content information storage area configured to store the content to be output by the plurality of node devices and a plurality of node information storage areas each configured to store information corresponding to the plurality of node devices, and
wherein the control command is stored in a node information storage area corresponding to the at least one target node device among the plurality of node information storage areas.

2. The electronic apparatus of claim 1, wherein the Ethernet frame further comprises a custom field, and
wherein the one or more processor is further configured to:
determine, based on the user command, control code information indicating a mode of transmission of the content and the control command in the Ethernet frame to the at least one target node device, and
generate the Ethernet frame by including the obtained control code information in the custom field.

3. The electronic apparatus of claim 1, wherein the at least one target node device comprises a first node device and a second node device, and
wherein the one or more processor is further configured to:
transmit the Ethernet frame comprising the control command to the first node device through the communication interface, and
check, based on a feedback frame frame being-received from the second node device, whether an error occurred in an operation performed by the at least one target node device in response to the control command.

4. The electronic apparatus of claim 3, wherein the feedback frame comprises a first feedback frame and a second feedback frame, and
wherein the first feedback frame corresponds to an operation performed by the first node device based on the Ethernet frame, and the second feedback frame corresponds to an operation performed by the second node device that receives the first feedback frame from the first node device.

5. The electronic apparatus of claim 3, wherein the one or more processor is further configured to:
determine reference code information corresponding to the operation performed by the at least one target node device in response to the control command, identify feedback code information included in the feed-back frame received through the communication inter-face, and check, based on the obtained feedback code information and reference code information, whether an error occurred in an operation performed by the at least one target node device in response to the control command.

6. The electronic apparatus of claim 5, wherein the one or more processor is further configured to retransmit the Eth-ernet frame to the first node device through the communi-cation interface based on a mismatch between the feedback code information and reference code information.

7. The electronic apparatus of claim 5, wherein the feedback code information is updated based on information received from an adjacent node device through the serial communication corresponding to an operation performed by the adjacent node device in response to a control command provided in the ethernet frame for the adjacent node device.

8. The electronic apparatus of claim 1, wherein the one or more processor is configured to:

based on the user command including a predetermined command, generate the Ethernet frame comprising the content and the control command corresponding to the predetermined command, and based on the user command not including the predeter-mined command, generate the Ethernet frame compris-ing the content.

9. The electronic apparatus of claim 1, wherein in case that the user command is a command to control each of a first target node device and a second target node device, the one or more processor is configured to store a first control command to control the first target node device in a first node information storage area corresponding to the first target node device among the plurality of node information storage areas included in the data field and a second control command to control the second target node device in a second node information storage area corresponding to the second target node device among the plurality of node information storage areas included in the data field, and generate the Ethernet frame based on the data field including the first control command and the second control com-mand.

10. The electronic apparatus of claim 1, wherein the Ethernet frame further comprises a custom field, and in case that the user command is a command to control a first target node device among the plurality of node devices, and wherein the one or more processor is further configured to:

store node address information corresponding to the first target node device in the custom field, store the control command to control the first target node device in any area of the data field, and generate the Ethernet frame based on the custom field including the node address information and the data field including the control command.

11. The electronic apparatus of claim 1, wherein the media content comprises at least one of audio content or video content.

12. A controlling method of an electronic apparatus stor-ing content and serially communicating with one or more node devices, among a plurality of node devices connected by serial communication, the controlling method compris-ing:

determining at least one target node device corresponding to a user command among the plurality of node devices, and a control command corresponding to the user command, the control command configured to control an operation of the at least one target node device;

generating an Ethernet frame based on the content and the control command, the Ethernet frame comprising a data field, and the content comprising media content; and transmitting the Ethernet frame to any one of the one or more node devices, wherein the data field comprises a content information storage area configured to store the content to be output by the plurality of node devices and a plurality of node information storage areas each configured to store information corresponding to the plurality of node devices, and wherein the control command is stored in a node infor-mation storage area corresponding to the at least one target node device among the plurality of node infor-mation storage areas.

13. The controlling method of claim 12, wherein the Ethernet frame further comprises a custom field, and wherein the controlling method further comprises:

determining, based on the user command, control code information indicating a mode of transmission of the content and the control command in the Ethernet frame to the at least one target node device; and generating the Ethernet frame by including the control code information in the custom field.

14. The controlling method as claimed in claim 12, wherein the at least one target node device comprises a first node device and a second node device, wherein, in the transmitting, the Ethernet frame compris-ing the control command is transmitted to the first node device, and wherein the controlling method further comprises:

checking, based on a feedback frame received from the second node device, whether an error occurred in an operation performed by the at least one target node device in response to the control command.

15. The controlling method as claimed in claim 14, wherein the feedback frame comprises a first feedback frame and a second feedback frame, and wherein the first feedback frame corresponds to an opera-tion performed by the first node device based on the Ethernet frame, and the second feedback frame corre-sponds to an operation performed by the second node device that receives the first feedback frame from the first node device.

16. The controlling method as claimed in claim 14, wherein the checking comprises:

determining reference code information corresponding to the operation performed by the at least one target node device in response to the control command, identifying feedback code information included in the feedback frame received through a communication interface of the electronic apparatus, and checking, based on the feedback code information and reference code information, whether an error occurred in an operation performed by the at least one target node device in response to the control command.

17. An electronic apparatus comprising:

a memory configured to store one or more instructions; and one or more processor configured execute the one or more instructions to:

determine a first node device in a node device network based on an input command, the node device net-work comprising a plurality of node devices con-nected in series;

obtain a control command corresponding to the first node device based on the input command, the control command configured to control an operation of the first node device;

generate an Ethernet frame by including content to be output by the plurality of node devices in a first information storage area of the Ethernet frame and the control command in a second information storage area of the Ethernet frame, among a plurality of second information storage areas, each of the plurality of second information storage areas respectively associated with one of the plurality of node devices connected in series, and the content comprising media content; and transmit the Ethernet frame to the node device network, wherein the electronic apparatus is configured to serially communicate with the plurality of node devices.

18. The electronic apparatus of claim 17, wherein the input command is a user input.

19. The electronic apparatus of claim 17, wherein the plurality of node devices are configured to communicate within the series in a bi-directional manner.

20. The electronic apparatus of claim 19, wherein the first node device is located at a start of the series connection.

21. The electronic apparatus of claim 19, wherein the first node device is at a location other than a start of the series connection.

\* \* \* \* \*